United States Patent
Potter et al.

(10) Patent No.: US 12,453,376 B2
(45) Date of Patent: Oct. 28, 2025

(54) VAPOR DELIVERY SYSTEMS

(71) Applicant: NICOVENTURES TRADING LIMITED, London (GB)

(72) Inventors: Mark Potter, London (GB); Daniel Ball, London (GB)

(73) Assignee: NICOVENTURES TRADING LIMITED, London (GB)

( * ) Notice: Subject to any disclaimer, the term of this patent is extended or adjusted under 35 U.S.C. 154(b) by 650 days.

(21) Appl. No.: 17/597,521

(22) PCT Filed: Jul. 8, 2020

(86) PCT No.: PCT/GB2020/051643
§ 371 (c)(1),
(2) Date: Jan. 10, 2022

(87) PCT Pub. No.: WO2021/005366
PCT Pub. Date: Jan. 14, 2021

(65) Prior Publication Data
US 2022/0248752 A1     Aug. 11, 2022

(30) Foreign Application Priority Data
Jul. 10, 2019   (GB) ..................................... 1909881

(51) Int. Cl.
*A24F 40/42*     (2020.01)
*A24F 40/485*    (2020.01)

(52) U.S. Cl.
CPC ............ *A24F 40/42* (2020.01); *A24F 40/485* (2020.01)

(58) Field of Classification Search
CPC .......... A24F 40/42; A24F 40/44; A24F 40/40; A24F 40/10; A24F 40/20; A24F 40/00; A24F 40/485
USPC .......................................................... 131/329
See application file for complete search history.

(56) References Cited

U.S. PATENT DOCUMENTS

| | | | |
|---|---|---|---|
| 11,596,751 B2 * | 3/2023 | Potter | A61M 15/0021 |
| 11,623,053 B2 * | 4/2023 | Yilmaz | A24F 40/44 |
| | | | 131/329 |
| 2004/0173228 A1 | 9/2004 | Coleman | |
| 2007/0137663 A1 | 6/2007 | Taylor et al. | |
| 2008/0149119 A1 | 6/2008 | Marquez et al. | |

(Continued)

FOREIGN PATENT DOCUMENTS

| | | |
|---|---|---|
| CA | 2641869 A1 | 5/2010 |
| CA | 3079626 A1 | 5/2019 |

(Continued)

OTHER PUBLICATIONS

International Search Report and Written Opinion for Application No. PCT/GB2020/051643, mailed on Oct. 9, 2020, 23 pages.

(Continued)

*Primary Examiner* — Harshad C Patel
(74) *Attorney, Agent, or Firm* — MERCHANT & GOULD P.C.

(57) ABSTRACT

An apparatus for generating an inhalable medium includes a receptacle for a flavor material for imparting a flavor to inhalable medium generated by the apparatus, the receptacle including a wall part for retaining the flavor material, the wall part including a plurality of openings for airflow and a non-planar region, wherein the plurality of openings are arranged in the non-planar region.

18 Claims, 9 Drawing Sheets

(56) References Cited

U.S. PATENT DOCUMENTS

| | | | |
|---|---|---|---|
| 2013/0160780 A1 | 6/2013 | Matsumoto et al. | |
| 2013/0263869 A1* | 10/2013 | Zhu | A24F 40/44 |
| | | | 131/329 |
| 2013/0306064 A1 | 11/2013 | Thorens et al. | |
| 2014/0338683 A1 | 11/2014 | Liu | |
| 2015/0335070 A1 | 11/2015 | Sears et al. | |
| 2016/0073695 A1 | 3/2016 | Sears et al. | |
| 2016/0120228 A1 | 5/2016 | Rostami et al. | |
| 2016/0150823 A1 | 6/2016 | Liu | |
| 2016/0309787 A1* | 10/2016 | Hawes | A61M 11/042 |
| 2016/0324216 A1 | 11/2016 | Li et al. | |
| 2017/0156401 A1 | 6/2017 | Liu | |
| 2017/0238606 A1 | 8/2017 | Matsumoto et al. | |
| 2017/0246407 A1 | 8/2017 | Matsumoto et al. | |
| 2017/0319799 A1* | 11/2017 | Yamada | H05B 1/0297 |
| 2018/0035719 A1 | 2/2018 | Turner et al. | |
| 2018/0125117 A1 | 5/2018 | Demeritt et al. | |
| 2018/0235277 A1 | 8/2018 | Lin et al. | |
| 2019/0037922 A1 | 2/2019 | Liu | |
| 2019/0166919 A1 | 6/2019 | Mlmaz | |
| 2020/0288770 A1* | 9/2020 | Potter | A24F 7/02 |
| 2021/0100284 A1* | 4/2021 | Yilmaz | A24F 40/42 |
| 2022/0183385 A1* | 6/2022 | Yilmaz | A24F 40/42 |
| 2022/0232891 A1* | 7/2022 | Potter | A24F 40/30 |
| 2022/0273045 A1* | 9/2022 | Poynton | A24F 40/30 |
| 2022/0312838 A1* | 10/2022 | Potter | A24F 40/50 |

FOREIGN PATENT DOCUMENTS

| | | |
|---|---|---|
| CN | 101500441 A | 8/2009 |
| CN | 105686086 A | 6/2016 |
| CN | 109414075 A | 3/2019 |
| CN | 109561735 A | 4/2019 |
| CN | 109688855 A | 4/2019 |
| CN | 113329942 A | 8/2021 |
| EA | 006333 B1 | 12/2005 |
| JP | 1978096482 U | 8/1978 |
| JP | S62100278 A | 5/1987 |
| JP | 1991007569 A | 1/1991 |
| JP | 2013521074 A | 6/2013 |
| JP | 2014504852 A | 2/2014 |
| JP | 2015513922 A | 5/2015 |
| JP | 2017515493 A | 6/2017 |
| JP | 2017215386 A | 12/2017 |
| JP | 2018512117 A | 5/2018 |
| JP | 2018516551 A | 6/2018 |
| KR | 200453400 Y1 | 4/2011 |
| KR | 101552254 B1 | 9/2015 |
| RU | 88916 U1 | 11/2009 |
| RU | 2673625 C1 | 11/2018 |
| RU | 2674084 C2 | 12/2018 |
| RU | 2687765 C1 | 5/2019 |
| WO | 2012026481 A1 | 3/2012 |
| WO | 2013183761 A1 | 12/2013 |
| WO | 2014113977 A1 | 7/2014 |
| WO | 2014183277 A1 | 11/2014 |
| WO | 2016121143 A1 | 8/2016 |
| WO | 2016123764 A1 | 8/2016 |
| WO | 2016208760 | 12/2016 |
| WO | 2017046363 A1 | 3/2017 |
| WO | 2017077503 A1 | 5/2017 |
| WO | 2017163051 A1 | 9/2017 |
| WO | 2017202953 A1 | 11/2017 |
| WO | 2018011037 A2 | 1/2018 |
| WO | 2018029186 A1 | 2/2018 |
| WO | 2018050612 A1 | 3/2018 |
| WO | 2018050613 A1 | 3/2018 |
| WO | 2018055552 A1 | 3/2018 |
| WO | 2018122389 A1 | 7/2018 |
| WO | 2019081569 A1 | 5/2019 |
| WO | 2020157461 A2 | 8/2020 |

OTHER PUBLICATIONS

"Decision to Grant received for Japanese Patent Application No. 2021-574287, mailed Sep. 26, 2023".

"Decision to Grant received for Russian Patent Application No. 2022100084, mailed on Aug. 29, 2023".

"Decision to Grant received for Russian Patent Application No. 2022100092, mailed on Mar. 20, 2023".

"International Preliminary Report on Patentability received for PCT Patent Application No. PCT/GB2020/051642, mailed on Jan. 20, 2022".

"International Preliminary Report on Patentability received for PCT Patent Application No. PCT/GB2020/051643, mailed on Jan. 20, 2022".

"International Preliminary Report on Patentability received for PCT Patent Application No. PCT/GB2020/051645, mailed on Jan. 20, 2022".

"International Search Report and Written Opinion for Application No. PCT/GB2020/051645, mailed on Oct. 15, 2020".

"International Search Report and Written Opinion received for PCT Patent Application No. PCT/GB2020/051642, mailed on Oct. 15, 2020".

"Notice of Allowance received for Australian Patent Application No. 2020310584, mailed on Oct. 12, 2023".

"Notice of Allowance received for Korean Patent Application No. 10-2022-7000701, mailed on Feb. 26, 2024".

"Notice of Reasons for Rejection received for Japanese Patent Application No. 2021-577172, mailed on Mar. 22, 2023".

"Office Action received for Chinese Application No. 202080048053.4, mailed on Jun. 17, 2024".

"Office Action received for Russian Patent Application No. 2022100102, mailed on May 23, 2022".

"Reasons for Refusal received for Japanese Patent Application No. 2021-575459, mailed on Oct. 17, 2023".

"Search Report received for Japanese Patent Application No. 2021-574287, mailed Mar. 16, 2023".

"Search Report received for Japanese Patent Application No. 2021-575459, mailed on Mar. 17, 2023".

Japanese Patent Office, Japanese Search report, Application No. 2021-577172, dated May 7, 2023, 30 pgs.

* cited by examiner

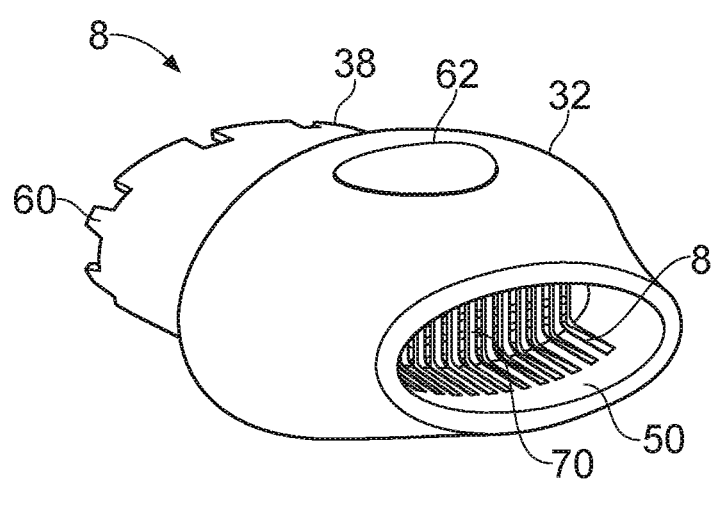 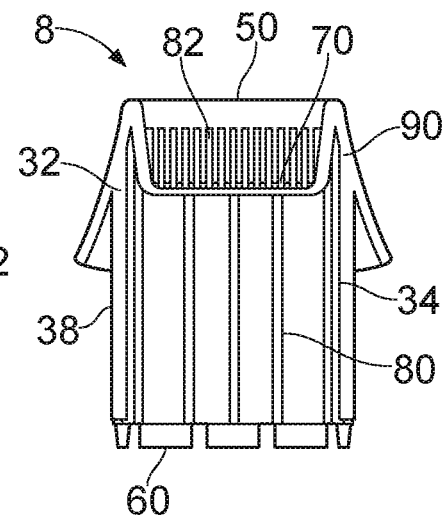
FIG. 3A  FIG. 3B
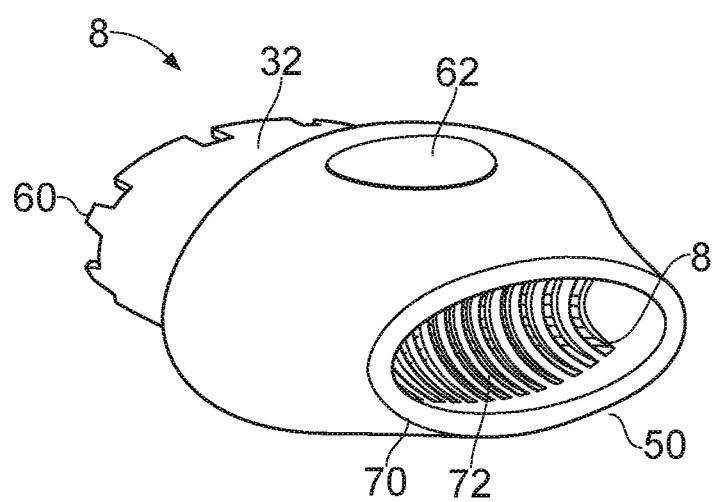 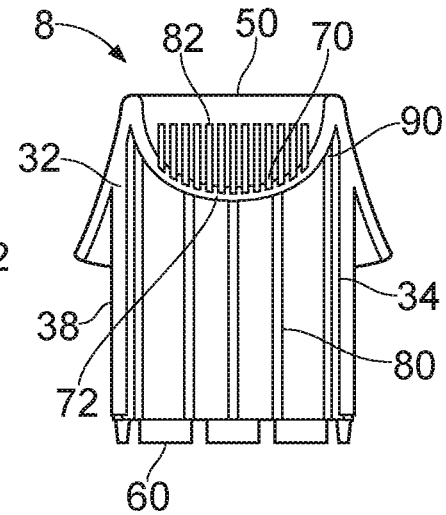
FIG. 4A  FIG. 4B

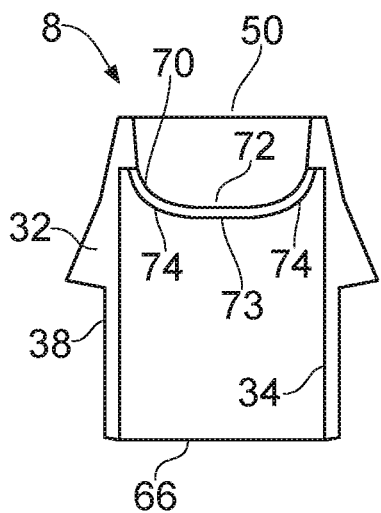
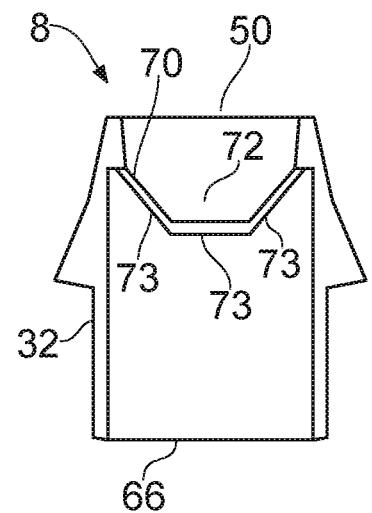
FIG. 8     FIG. 9
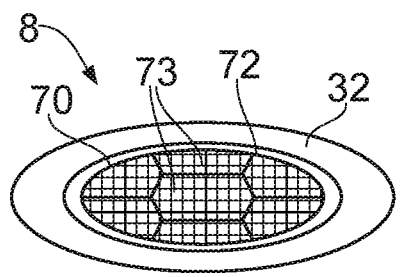
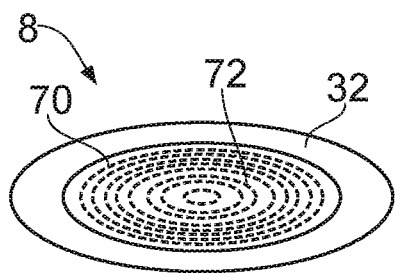
FIG. 10     FIG. 11
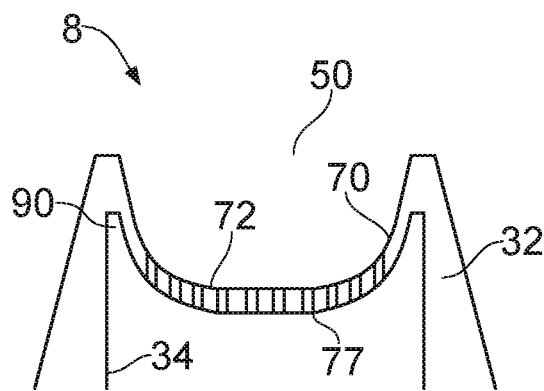
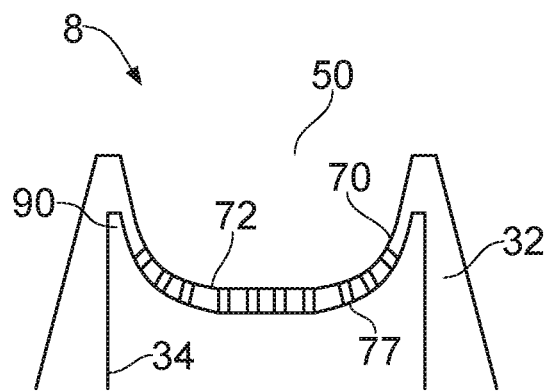
FIG. 12     FIG. 13

VAPOR DELIVERY SYSTEMS

PRIORITY CLAIM

The present application is a National Phase entry of PCT Application No. PCT/GB2020/051643, filed Jul. 8, 2020, which claims priority from GB Patent Application No. 1909881.3, filed Jul. 10, 2019, each of which is hereby fully incorporated herein by reference.

TECHNICAL FIELD

The present disclosure relates to vapor delivery systems such as nicotine delivery systems (e.g. electronic cigarettes and the like).

BACKGROUND

Electronic vapor delivery systems such as electronic cigarettes (e-cigarettes) generally contain a vapor precursor material, such as a reservoir of a source liquid containing a formulation, typically including nicotine, or a solid material such as a tobacco-based product, from which a vapor is generated for inhalation by a user, for example through heat vaporization. Thus, a vapor delivery system will typically comprise a vapor generation chamber containing a vaporizer, e.g. a heating element, arranged to vaporize a portion of precursor material to generate a vapor in the vapor generation chamber. As a user inhales on the device and electrical power is supplied to the vaporizer, air is drawn into the device through inlet holes and into the vapor generation chamber where the air mixes with the vaporized precursor material and forms a condensation aerosol. There is a flow path between the vapor generation chamber and an opening in the mouthpiece so the incoming air drawn through the vapor generation chamber continues along the flow path to the mouthpiece opening, carrying some of the vapor/condensation aerosol with it, and out through the mouthpiece opening for inhalation by the user. Some electronic cigarettes may also include a flavor material in the flow path through the device to impart additional flavors. Such devices may sometimes be referred to as hybrid devices and the flavor material may, for example, include a portion of tobacco arranged in the air path between the vapor generation chamber and the mouthpiece so that vapor/condensation aerosol drawn through the devices passes through the portion of tobacco before exiting the mouthpiece for user inhalation.

Various approaches are described herein which seek to provide improved performance of the device discussed above.

SUMMARY

According to a first aspect of certain embodiments there is provided an aerosol delivery system comprising an apparatus for generating an inhalable medium comprising a receptacle for a flavor material for imparting a flavor to inhalable medium generated by the apparatus, the receptacle comprising a wall part for retaining the flavor material, the wall part comprising a plurality of openings for airflow and a non-planar region, wherein the plurality of openings are arranged in the non-planar region.

According to another aspect of certain embodiments there is provided aerosol provision means comprising means for generating an inhalable medium comprising receptacle means for flavor material means for imparting a flavor to inhalable medium generated by the means for generating an inhalable medium, the receptacle means comprising wall part means for retaining the flavor material means, the wall part means comprising a plurality of opening means for airflow and a non-planar region, wherein the plurality of opening means are arranged in the non-planar region.

According to another aspect of certain embodiments there is provided a receptacle for a flavor material for imparting a flavor to an inhalable medium generated by an apparatus for generating an inhalable medium, the receptacle comprising a wall part for retaining a flavor material, the wall part comprising a plurality of openings for airflow and a non-planar region, wherein the plurality of openings are arranged in the non-planar region.

According to another aspect of certain embodiments there is provided a method of imparting a flavor to inhalable medium generated by an apparatus for generating inhalable medium, the method comprising providing a receptacle for a flavor material for imparting a flavor to the inhalable medium, the receptacle comprising a wall part for retaining the flavor material, the wall part comprising a plurality of openings for airflow and a non-planar region, wherein the plurality of openings are arranged in the non-planar region, and wherein the method further comprises passing the inhalable medium through the receptacle to impart the flavor to the inhalable medium.

According to another aspect of certain embodiments there is provided an aerosol delivery system comprising an apparatus for generating an inhalable medium comprising a receptacle for a flavor material for imparting a flavor to inhalable medium generated by the apparatus, wherein the receptacle comprises a side wall part, an outlet wall part and an inlet wall part, wherein the side wall part defines a cavity for the flavor material and the inlet wall part and the outlet wall part each comprise a plurality of openings to allow airflow through the cavity, and wherein the inlet wall part and outlet wall part are mounted to the side wall part so as to compress the flavor material in the cavity between the inlet wall part and the outlet wall part.

According to another aspect of certain embodiments there is provided a receptacle for a flavor material for imparting a flavor to an inhalable medium generated by an apparatus for generating an inhalable medium, wherein the receptacle comprises a side wall part, an outlet wall part and an inlet wall part, wherein the side wall part defines a cavity for the flavor material and the inlet wall part and the outlet wall part each comprise a plurality of openings to allow airflow through the cavity, and wherein the inlet wall part and outlet wall part are mounted to the side wall part so as to compress the flavor material in the cavity between the inlet wall part and the outlet wall part.

According to another aspect of certain embodiments there is provided means for generating an inhalable medium comprising receptacle means for flavor material means for imparting a flavor to inhalable medium generated by the means for generating an inhalable medium, wherein the receptacle means comprises side wall means, outlet wall means and inlet wall means, wherein the side wall means defines a cavity for the flavor material and the inlet wall means and the outlet wall means each comprise a plurality of openings to allow airflow through the cavity, and wherein the inlet wall means and outlet wall means are mounted to the side wall means so as to compress the flavor material in the cavity between the inlet wall means and the outlet wall means According to another aspect of certain embodiments there is provided a method of imparting a flavor to inhalable medium generated by an apparatus for generating inhalable medium, wherein the method comprises providing a receptacle for a flavor material, wherein the receptacle comprises a side wall part, an outlet wall part and an inlet wall part, wherein the side wall part defines a cavity for the flavor material and the inlet wall part and the outlet wall part each comprise a plurality of openings to allow airflow through the cavity, and wherein the inlet wall part and outlet wall part are mounted to the side wall part so as to compress the flavor material in the cavity between the inlet wall part and the outlet wall part, and wherein the method further comprises passing the inhalable medium through the receptacle to impart the flavor to the inhalable medium.

According to another aspect of certain embodiments there is provided a method of manufacturing a receptacle for a flavor material for imparting a flavor to an inhalable medium generated by an apparatus for generating an inhalable medium, wherein the receptacle comprises a side wall part, an outlet wall part and an inlet wall part, wherein the side wall part defines a cavity for the flavor material and the inlet wall part and the outlet wall part each comprise a plurality of openings to allow airflow through the cavity, and wherein the method comprises providing the side wall part with one of the inlet wall part and the outlet wall part mounted thereto; placing flavor material into the cavity; and mounting the other of the inlet wall part and the outlet wall part to the side wall part so as to compress the flavor material between the inlet wall part and the outlet wall part.

According to another aspect of certain embodiments there is provided an aerosol delivery system comprising an apparatus for generating an inhalable medium comprising a receptacle for a flavor material for imparting a flavor to inhalable medium generated by the apparatus, the receptacle comprising a housing comprising a mouthpiece part, a side wall part and an outlet wall part in the mouthpiece part with a plurality of openings for airflow, wherein the mouthpiece part, the side wall part and the outlet wall part are integrally formed.

According to another aspect of certain embodiments there is provided a receptacle for a flavor material for imparting a flavor to an inhalable medium generated by an apparatus for generating an inhalable medium, the receptacle comprising a housing comprising a mouthpiece part, a side wall part and an outlet wall part in the mouthpiece part with a plurality of openings for airflow, wherein the mouthpiece part, the side wall part and the outlet wall part are integrally formed.

According to another aspect of certain embodiments there is provided a means for generating an inhalable medium comprising receptacle means for flavor material means for imparting a flavor to inhalable medium generated by the means for generating an inhalable medium, the receptacle means comprising housing means comprising mouthpiece means, side wall means and outlet wall means in the mouthpiece means with a plurality opening means for airflow, wherein the mouthpiece means, the side wall means and the outlet wall means are integrally formed.

According to another aspect of certain embodiments there is provided a method of imparting a flavor to inhalable medium generated by an apparatus for generating inhalable medium, the method comprising providing an apparatus comprising a receptacle for a flavor material for imparting a flavor to an inhalable medium generated by an apparatus for generating an inhalable medium, the receptacle comprising a housing comprising a mouthpiece part, a side wall part and an outlet wall part in the mouthpiece part with a plurality of openings for airflow, wherein the mouthpiece part, the side wall part and the outlet wall part are integrally formed, and wherein the method further comprises passing the inhalable medium through the receptacle to impart the flavor to the inhalable medium.

According to another aspect of certain embodiments there is provided a method of manufacturing a receptacle for a flavor material for imparting a flavor to an inhalable medium generated by an apparatus for generating an inhalable medium, the method comprising integrally forming a mouthpiece part, a side wall part and an outlet wall part in the mouthpiece part with a plurality of openings for airflow.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Embodiments of the disclosure will now be described, by way of example only, with reference to the accompanying drawings, in which:

FIGS. 3A and 3B represent a perspective drawing and a cross-section view, respectively, of a receptacle for use with an aerosol delivery system in accordance with certain embodiments of the disclosure.

FIGS. 4A and 4B represent a perspective drawing and a cross-section view, respectively, of a further receptacle for use with an aerosol delivery system in accordance with certain embodiments of the disclosure.

FIGS. 5 to 13 schematically represent in cross-section, further example receptacles for use with an aerosol delivery system in accordance with certain embodiments of the disclosure;

Figure 1:
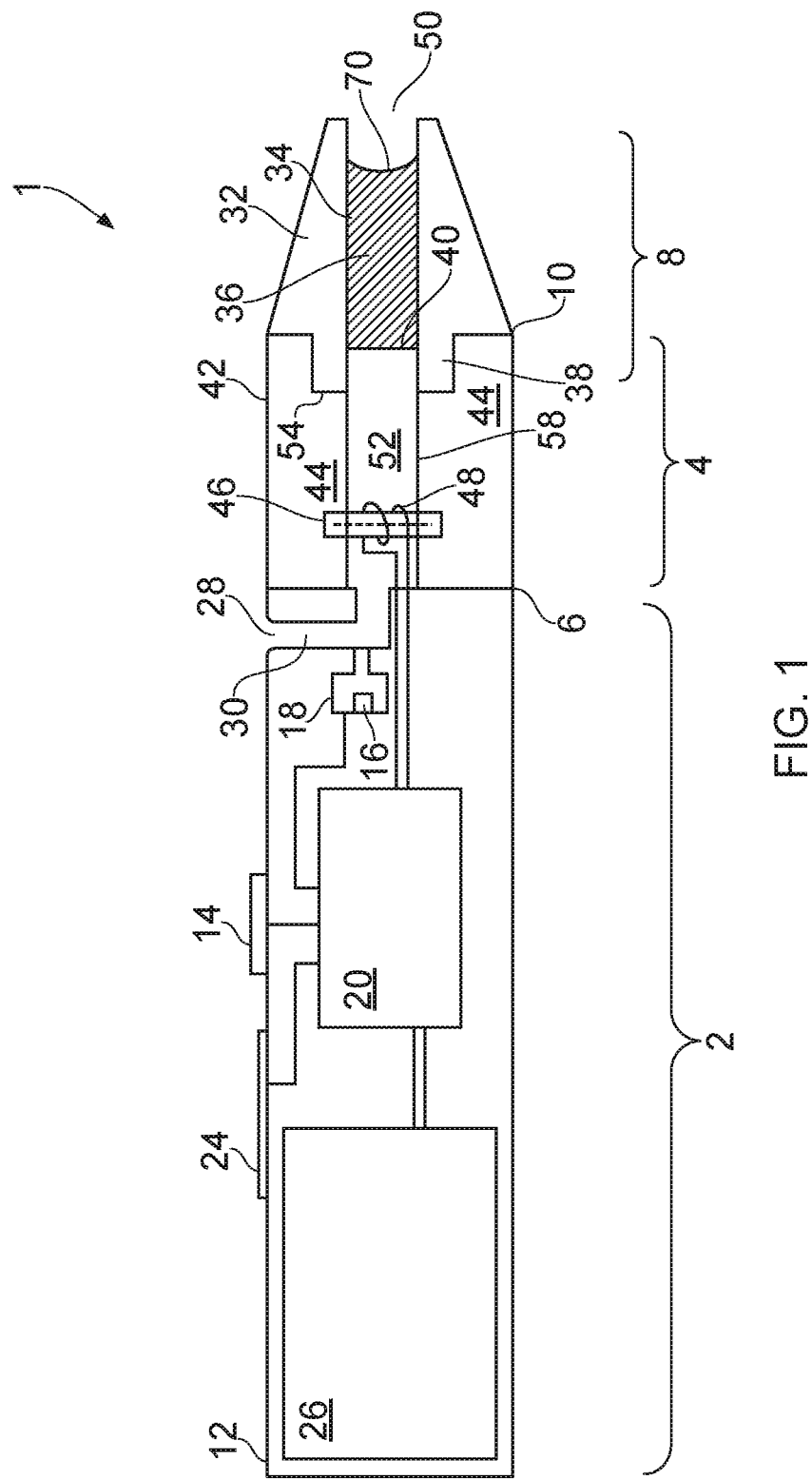
FIG. 1 schematically represents in cross-section an aerosol delivery system in accordance with certain embodiments of the disclosure.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

The present disclosure relates to vapor delivery systems, which may also be referred to as aerosol delivery systems, such as e-cigarettes, including hybrid devices. Throughout the following description the term "e-cigarette" or "electronic cigarette" may sometimes be used, but it will be appreciated this term may be used interchangeably with vapor provision system/device, electronic vapor provision system/device, vapor delivery system/device, electronic vapor delivery system/device, aerosol provision system/device, electronic aerosol provision system/device, aerosol delivery, and electronic aerosol delivery system/device. Furthermore, and as is common in the technical field, the terms "vapor" and "aerosol", and related terms such as "vaporize", "volatilize" and "aerosolize", may generally be used interchangeably.

Aerosol delivery systems often, though not always, comprise a modular assembly including both a reusable part (also referred to as a control unit) and a replaceable/disposable cartridge part (also referred to as a consumable part). Often the replaceable cartridge part will comprise the aerosolizable material and the vaporizer and the reusable part will comprise the power supply (e.g. rechargeable battery), activation mechanism (e.g. button or puff sensor), and control circuitry. However, it will be appreciated these different parts may also comprise further elements depending on functionality. For example, for a so-called hybrid device the cartridge part may also comprise an additional flavor material or aerosol modifying agent. For example the flavor material may be a portion of tobacco, provided as an insert ("pod") to add flavor to an aerosol generated elsewhere in the system. The flavor material or aerosol modifying agent may be a substance that is able to modify aerosol in use. The agent may modify aerosol in such a way as to create a physiological or sensory effect on the human body. Example aerosol modifying agents are actives, flavorants and sensates. A sensate creates an organoleptic sensation that can be perceived through the senses, such as a cool or sour sensation.

The flavor material may be removable so it can be replaced, for example to change flavor or because the usable lifetime of the flavor material is less than the usable lifetime of the aerosol generating components of the cartridge. The reusable device part will often also comprise additional components, such as a user interface for receiving user input and displaying operating status characteristics.

As used herein, the terms "flavor" and "flavorant uand" refer to materials which, where local regulations permit, may be used to create a desired taste or aroma in a product for adult consumers. In some examples, flavor materials may include tobacco materials or materials including tobacco extracts and/or nicotine. In some examples, flavor materials may include extracts (e.g., licorice/liquorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof.

For modular devices a cartridge and control unit may be electrically and mechanically coupled together for use, for example using a screw thread, latching or bayonet fixing with appropriately engaging electrical contacts. When the vapor precursor material in a cartridge is exhausted, or the user wishes to switch to a different cartridge having a different vapor precursor material, a cartridge may be removed from the control unit and a replacement cartridge attached in its place.

It is relatively common for aerosol delivery systems, including multi-part devices, to have a generally elongate shape and, for the sake of providing a concrete example, certain embodiments of the disclosure described herein will be taken to comprise a generally elongate multi-part device employing disposable cartridges which include an aerosolizable material, a flavor imparting medium and electric heater for vaporizing the aerosolizable material to form a condensation aerosol for user inhalation during use. These vapor delivery systems may be called, for example, hybrid systems or hybrid e-cigarettes. In some cases the flavor material insert may itself be removable from the disposable cartridge part so it can be replaced separately from the cartridge or the reusable part, for example to change flavor or because the usable lifetime of the flavor material insert is different from the usable lifetime of the vapor generating components of the cartridge. The flavor material insert may be contained within a receptacle. Throughout the following description the terms "pod", "receptacle", "container" or "insert" may sometimes be used, but it will be appreciated these terms may be used interchangeably. In some examples, the pod may be reusable and a user may be able to access a flavor material insert within the pod to replace the flavor material insert. In other examples, the pod may be disposable and a user is discouraged from accessing or attempting to replace the flavor material insert. Use of a pod may provide an enhanced user experience by, for example, ensuring optimal positioning of the flavor material insert within an airflow path and/or by restricting the properties of the flavor material insert (e.g. volume, consistency, density etc.).

It will be appreciated the underlying principles described herein may equally be adopted for different configurations of aerosol delivery systems, for example devices conforming to other overall shapes, for example based on so-called box-mod high performance devices that typically have a more box-like shape or smaller form-factor devices such as so-called pod-mod devices. More generally, it will be appreciated embodiments of the disclosure may be based on aerosol delivery systems configured to incorporate the principles described herein regardless of the specific format of other aspects of such aerosol delivery systems.

FIG. 1 is a cross-sectional view through an example e-cigarette 1 in accordance with certain embodiments of the disclosure. The e-cigarette 1 comprises three main components, namely a reusable part 2, a replaceable/disposable cartridge part 4 and a flavor imparting means 8, such as a removable receptacle, containing a portion of a flavoring material 36 (for example shredded, reconstituted or extruded tobacco) provided within an insert housing. However, the fact this example is a multi-part hybrid device is not in itself directly significant to the device activation functionality as described further herein.

In normal use the reusable part 2 and the cartridge part 4 are releasably coupled together at an interface 6. When the cartridge part is exhausted (i.e. when aerosolizable material, such as a liquid, in the cartridge part is depleted or substantially depleted) or the user simply wishes to switch to a different cartridge part, the cartridge part may be removed from the reusable part and a replacement cartridge part attached to the reusable part in its place. The interface 6 provides a structural, electrical and air path connection between the two parts and may be established in accordance with conventional techniques, for example based around a screw thread, latch mechanism, or bayonet fixing with appropriately arranged electrical contacts and openings for establishing the electrical connection and air path between the two parts as appropriate. The specific manner by which the cartridge part 4 mechanically mounts to the reusable part 2 is not significant to the principles described herein, but for the sake of a concrete example is assumed here to comprise a latching mechanism, for example with a portion of the cartridge being received in a corresponding receptacle in the reusable part with cooperating latch engaging elements (not represented in FIG. 1). It will also be appreciated the interface 6 in some implementations may not support an electrical connection between the respective parts. For example, in some implementations a vaporizer may be provided by the reusable part rather than in the cartridge part, or the transfer of electrical power from the reusable part to the cartridge part may be wireless (e.g. based on electromagnetic induction), so that an electrical connection between the reusable part and the cartridge part is not needed.

The cartridge part 4 may in accordance with certain embodiments of the disclosure be broadly conventional. In FIG. 1, the cartridge part 4 comprises a cartridge housing 42 formed of a plastics material. The cartridge housing 42 supports other components of the cartridge part and provides the mechanical interface 6 with the reusable part 2. The cartridge housing is generally circularly symmetric about a longitudinal axis along which the cartridge part couples to the reusable part 2. In this example the cartridge part has a length of around 4 cm and a diameter of around 3 cm. However, it will be appreciated the specific geometry, and more generally the overall shapes and materials used, may be different in different implementations.

Within the cartridge housing 42 is a reservoir 44 that contains liquid vapor precursor material. The liquid vapor precursor material may be conventional, and may be referred to as e-liquid. The liquid reservoir 44 in this example has an annular shape with an outer wall defined by the cartridge housing 42 and an inner cartridge wall 58 that defines an air path 52 through the cartridge part 4. The reservoir 44 is closed at each end with end walls to contain the e-liquid. The reservoir 44 may be formed in accordance with conventional techniques, for example it may comprise a plastics material and be integrally molded with the cartridge housing 42.

In normal use the cartridge part 4 and the receptacle 8 are releasably coupled together at an interface 1. When the flavoring material 36 within the receptacle 8 is exhausted or the user simply wishes to switch to a different receptacle and/or flavoring material, the receptacle may be removed from the cartridge part and the flavoring material may be replaced within the receptacle or a different receptacle may be attached to the cartridge part in its place. The interface 10 provides a structural and air path connection between the two parts and may be established in accordance with conventional techniques, for example based around a screw thread, latch mechanism, or bayonet fixing with appropriately arranged electrical contacts and openings for establishing the electrical connection and air path between the two parts as appropriate. The specific manner by which the cartridge part 4 mechanically mounts to the receptacle 8 is not significant to the principles described herein, but in these and other examples, the retention and positioning of the receptacle 8 may be due to friction and/or may be facilitated by clips, ledges and other features within the air path 52. For example an insertion portion 38 of the receptacle 8 may be inserted into a receiving portion 54 provided in an open end of air path 52 opposite to the end of the cartridge 4 which couples to the control unit 2. The insertion portion 38 and/or the receiving portion 54 may have surface protrusions (e.g. bumps or ridges) to aid the retention due to friction of the receptacle 8 within the cartridge part 4.

It will also be appreciated the interface 10 in some implementations may support an electrical connection between the respective parts. For example, the receptacle 8 may include a heater for heating of the flavoring material 36.

In the example shown, the receptacle 8 includes a housing or side wall part 32 which defines a channel or cavity 34 within which a flavorant 36 may be housed or retained. The side wall part 32 for the receptacle 8 may also include two open ends. In normal use, air or other inhalable medium may flow from one end to the other end of the cavity (for example, during a puff) to allow air drawn along the air path 52 during use to pass through the flavoring material 36 and so pick up flavors (for example tobacco flavors) before exiting the receptacle though mouthpiece outlet 50 (i.e. an aperture or an opening) for user inhalation. To retain or position the flavorant 36, the receptacle may include a channel inlet wall part 40 (i.e. lower or upstream wall) and a channel outlet wall part 70 (i.e. upper or downstream wall) mounted to the channel wall part 32, such that each of the channel inlet wall part 40 and the channel outlet wall part 70 cover the open ends, respectively. The channel inlet wall part 40 and the channel outlet wall part 70 each have a plurality of holes, openings or apertures for airflow. For example, the channel inlet wall part 40 and the channel outlet wall part 70 may be formed by a mesh, a perforated wall part or an air permeable screen. The channel inlet wall part 40 and channel outlet wall part 70 may be provided towards opposite ends of channel wall part 34. For example, one or both may be positioned at the ends of the channel wall part 34, or one or both may be positioned inset from the end of the channel wall part 34 (for example, inset by between 2 and 20% of the length of channel wall part 34, such as between 5% and 15% of the length of the channel wall part 34).

The channel inlet wall part 40 (i.e. lower or upstream wall) and a channel outlet wall part 70 (i.e. upper or downstream wall) may be either replaceably mounted to the channel wall part 32 or they may be fixedly mounted to the channel wall outlet part 70. By replaceably mounted, it is meant that the receptacle 8 is configured such that wall parts can be detached if required (for example, to allow replacement or refiling of the receptacle 8 with a flavor material). By fixedly mounted, it is meant that the receptacle 8 is configured such that the wall parts cannot be detached (for example, any detachment may require breaking a component of the receptacle 8). It will be appreciated that in some examples, it may be advantageous to allow one wall part (e.g. the inlet wall part 40) to be fixedly mounted to the side wall part 32, and the other wall part (e.g. the outlet wall part 70) to be replaceably mounted the side wall part 32.

The inlet wall part 40 and/or the outlet wall part 70 may be mounted to the side wall part by a particular engagement mechanism; for example using a latch; a bayonet; a push fit;

and a threaded connection. The side wall part 32 may have corresponding features to enable a connection. While it will be appreciated that the use of a latch, a bayonet, a push fit and a threaded connection typically represent reversible engagement mechanisms; to create a fixed mount or engagement, adhesive bonding and or ultrasonic welding could be used after first connecting via an engagement mechanism, to create a permanent bond. In other examples, ultrasonic welding, adhesive bonding or other method may be used to fixedly mount one or both of the wall parts 40,70 to the side wall part 32 without any of the engagement mechanisms described above. In some other examples, one of the wall parts 40,70 may be integrally formed with the side wall part 32 such that the selected one of the wall parts 40,70 is inherently fixedly mounted to the side wall part 32. Other methods of mounting either inlet wall part 40 or outlet wall part 70 will be described in more detail below.

It will be appreciated that the channel inlet wall part 40 and the channel outlet wall part 70 do not necessarily need to be positioned symmetrically with respect to a center point of the receptacle 8. In some examples, the channel inlet wall part 40 and the channel outlet wall part 70 may be configured substantially differently to each other. For example, as shown in FIG. 1, the channel inlet wall part 40 may be configured to have a flat or planar shape, while the channel outlet wall part 70 may be configured to have a curved or non-planar shape. Furthermore, the channel inlet wall part 40 and the channel outlet wall part 70 may be constructed from different materials. For example, the channel inlet wall part 40 may be constructed from a metal material and the channel outlet wall part 70 may be constructed from a plastics material, or vice versa. In some examples the channel inlet wall part 40 and/or the channel outlet wall part 70 may be constructed from the same material as the side wall part 32; for example the channel inlet wall part 40 and/or the channel outlet wall part 70 may be constructed from the same plastics material as the side wall part 32. In some examples, one of the channel inlet wall part 40 or the channel outlet wall part 70 may be integrally formed with the receptacle side wall part 32 (for example, by integrally molding the components). The receptacle side wall part 32, the channel inlet wall part 40 and/or the channel outlet wall part 70 may comprise or consist of a plastics material. Example materials include copolyester (Tritan), polybutylene terephthalate, polycarbonate, polyphthalamide (Grivory) and polypropylene.

In some examples, the side wall part 32 of the receptacle 8 may define or otherwise incorporate a mouthpiece element. For example, the side wall part 32 may be configured to provide an outer surface shaped to aid forming of a seal by lips of a user during use. In other examples, a mouthpiece may be attached downstream of the receptacle 8 (not shown).

The cartridge part further comprises a wick 46 and a heater (vaporizer) 48 located towards an end of the reservoir 44 opposite to the receptacle 8. In this example the wick 46 extends transversely across the cartridge air path 52 with its ends extending into the reservoir 44 of e-liquid through openings in the inner wall of the reservoir 44. The openings in the inner wall of the reservoir 44 are sized to broadly match the dimensions of the wick 46 to provide a reasonable seal against leakage from the liquid reservoir into the cartridge air path without unduly compressing the wick, which may be detrimental to its fluid transfer performance.

The wick 46 and heater 48 are arranged in the cartridge air path 52 such that a region of the cartridge air path 52 around the wick 46 and heater 48 in effect defines a vapor generating region or vaporization region for the cartridge part. The e-liquid in the reservoir 44 infiltrates the wick 46 through the ends of the wick extending into the reservoir 44 and is drawn along the wick by surface tension/capillary action (i.e. wicking). The heater 48 in this example comprises an electrically resistive wire coiled around the wick 46. In this example the heater 48 comprises a nickel chrome alloy (Cr20Ni80) wire and the wick 46 comprises a glass fiber bundle, but it will be appreciated the specific vaporizer configuration is not significant to the principles described herein. In use electrical power may be supplied to the heater 48 to vaporize an amount of e-liquid (vapor precursor material) drawn to the vicinity of the heater 48 by the wick 46. Vaporized e-liquid may then become entrained in air drawn along the cartridge air path from the vaporization region through channel wall part 34 of the receptacle 8 and out the mouthpiece outlet 50 for user inhalation.

The rate at which e-liquid is vaporized by the vaporizer (heater) 48 will depend on the amount (level) of power supplied to the heater 48 during use. Thus electrical power can be applied to the heater to selectively generate vapor from the e-liquid in the cartridge part 4, and furthermore, the rate of vapor generation can be changed by changing the amount of power supplied to the heater 48, for example through pulse width and/or frequency modulation techniques.

The specific ways in which various aspects of the vapor delivery system function are not directly relevant to the principles underlying the examples described herein. For example, whereas the above-described embodiments have primarily focused on devices having an electrical heater based vaporizer for heating a liquid vapor precursor material, the same principles may be adopted in accordance with vaporizers based on other technologies, for example piezo-electric vibrator based vaporizers or optical heating vaporizers, and also devices based on other aerosol precursor materials, for example solid materials, such as plant derived materials, such as tobacco derivative materials, or other forms of vapor precursor materials, such as gel, paste or foam based vapor precursor materials.

The reusable part 2 comprises an outer housing 12 with an opening that defines an air inlet 28 for the e-cigarette, a battery 26 for providing operating power for the electronic cigarette, control circuitry 20 for controlling and monitoring the operation of the electronic cigarette, a user input button 14, an inhalation sensor (puff detector) 16, which in this example comprises a pressure sensor located in a pressure sensor chamber 18, and a visual display 24.

The outer housing 12 may be formed, for example, from a plastics or metallic material and in this example has a circular cross-sectional area generally conforming to the shape and size of the cartridge part 4, so as to provide a smooth transition between the two parts at the interface 6. In this example, the reusable part has a length of around 6 cm so the overall length of the e-cigarette when the cartridge part and reusable part are coupled together is around 10 cm. However (and as already noted) it will be appreciated that the overall shape and scale of an electronic cigarette implementing an embodiment of the disclosure is not significant to the principles described herein.

The air inlet 28 connects to an air path 30 through the reusable part 2. The reusable part air path 30 in turn connects to the cartridge air path 52 across the interface 6 when the reusable part 2 and cartridge part 4 are connected together. The pressure sensor chamber 18 containing the pressure sensor 16 is in fluid communication with the air path 30 in the reusable part 2 (i.e. the pressure sensor chamber 18 branches off from the air path 30 in the reusable part 2). Thus, when a user inhales on the mouthpiece opening 50, there is a drop in pressure in the pressure sensor chamber 18 that may be detected by the pressure sensor 16, and also air is drawn in through the air inlet 28, along the reusable part air path 30, across the interface 6, through the vapor generation region in the vicinity of the atomizer 48 (where vaporized e-liquid becomes entrained in the air flow when the vaporizer is active), along the cartridge air path 52, and out through the mouthpiece opening 50 for user inhalation.

The battery 26 in this example is rechargeable and may be of a conventional type, for example of the kind normally used in electronic cigarettes and other applications requiring provision of relatively high currents over relatively short periods. The battery 26 may be recharged through a charging connector in the reusable part housing 12, for example a USB connector.

The user input button 14 in this example is a conventional mechanical button, for example comprising a spring mounted component which may be pressed by a user to establish an electrical contact. In this regard, the input button may be considered to provide a manual input mechanism for the terminal device, but the specific manner in which the button is implemented is not significant. For example, different forms of mechanical button or touch-sensitive button (e.g. based on capacitive or optical sensing techniques) may be used in other implementations. The specific manner in which the button is implemented may, for example, be selected having regard to a desired aesthetic appearance.

The display 24 is provided to give a user a visual indication of various characteristics associated with the electronic cigarette, for example current power setting information, remaining battery power, and so forth. The display may be implemented in various ways. In this example the display 24 comprises a conventional pixelated LCD screen that may be driven to display the desired information in accordance with conventional techniques. In other implementations the display may comprise one or more discrete indicators, for example LEDs, that are arranged to display the desired information, for example through particular colors and/or flash sequences. More generally, the manner in which the display is provided and information is displayed to a user using the display is not significant to the principles described herein. Some embodiments may not include a visual display and may include other means for providing a user with information relating to operating characteristics of the electronic cigarette, for example using audio signaling or haptic feedback, or may not include any means for providing a user with information relating to operating characteristics of the electronic cigarette.

The control circuitry 20 is suitably configured/programmed to control the operation of the electronic cigarette to provide functionality in accordance with embodiments of the disclosure as described further herein, as well as for providing conventional operating functions of the electronic cigarette in line with the established techniques for controlling such devices. The control circuitry (processor circuitry) 20 may be considered to logically comprise various sub-units/circuitry elements associated with different aspects of the electronic cigarette's operation in accordance with the principles described herein and other conventional operating aspects of electronic cigarettes, such as display driving circuitry and user input detection. It will be appreciated that the functionality of the control circuitry 20 can be provided in various different ways, for example using one or more suitably programmed programmable computer(s) and/or one or more suitably configured application-specific integrated circuit(s)/circuitry/chip(s)/chipset(s) configured to provide the desired functionality.

In this example the vapor delivery system 1 comprises a user input button 14 and an inhalation sensor 16. The control circuitry 20 may be configured to receive signaling from the inhalation sensor 16 and to use this signaling to determine if a user is inhaling in the electronic cigarette and also to receive signaling from the input button 14 and to use this signaling to determine if a user is pressing (i.e. activating) the input button. These aspects of the operation of the electronic cigarette (i.e. puff detection and button press detection) may in themselves be performed in accordance with established techniques (for example using conventional inhalation sensor and inhalation sensor signal processing techniques and using conventional input button and input button signal processing techniques). Other example vapor delivery systems may have only one of a user input button 14 and an inhalation sensor 16. In further examples, a vapor delivery system may have neither a user input button or an inhalation sensor depending on the configuration and operation of the system.

In accordance with embodiments of the disclosure, the cross-sectional area of the air path at a location can be defined as the area of the plane perpendicular or transverse to a central or medial axis of the air path at that location. The area may be bound by at least one wall, for example, inner cartridge wall 58 or side wall part 32, or other structural features. In use, the air flows in the direction of the central axis from the air inlet 28 towards the air outlet 50. Hence, the cross-sectional area provides a measure of the transverse area available for air to flow through during use. In some examples, the cross-section of the air path may have a substantially circular shape, an elliptical shape, a polygonal shape or a rounded polygonal shape. The cross-sectional area of the air path is the area of the shape at that location. In some examples, the shape of the cross-section may change in different locations.

Figure 2A:
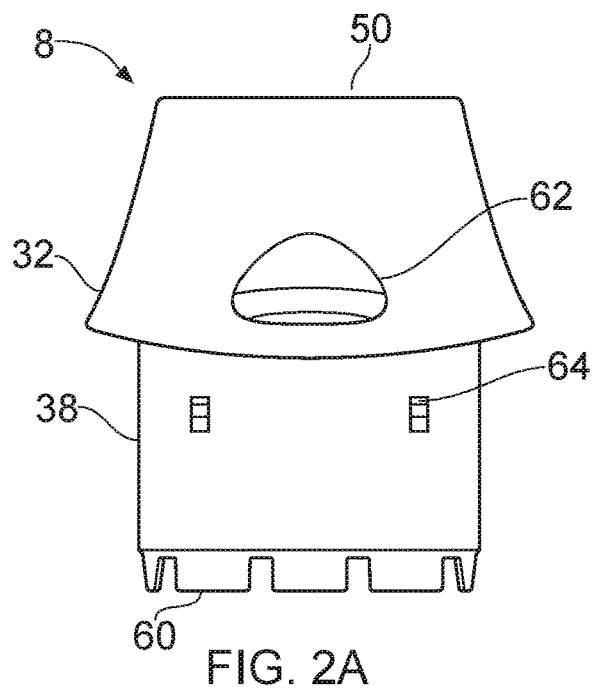
FIGS. 2A, 2B and 2C represent perspective drawings of a receptacle for use with an aerosol delivery system in accordance with certain embodiments of the disclosure.
Figure 2B:
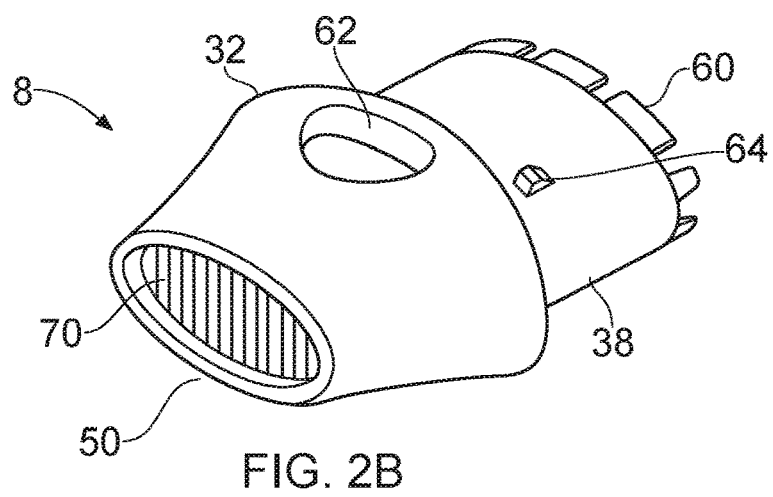
Figure 2C:
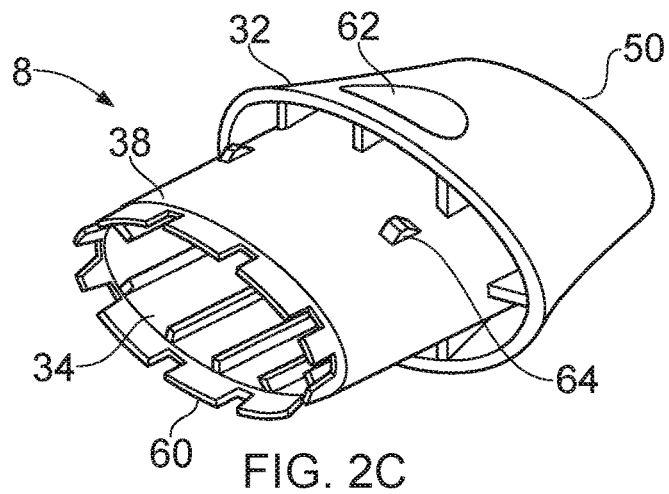

FIGS. 2A, 2B and 2C show perspective drawings of a receptacle in accordance with the example vapor delivery system of FIG. 1. The receptacle 8 is formed by a side wall part 32. An outer surface of the side wall part 32 is configured to provide a mouthpiece outlet 50 and an insertable portion 38 for inserting into a corresponding receiving portion 54 of a cartridge part 4 (not shown). The side wall part 32 has a flared and rounded shape, adjacent to the mouthpiece outlet 50, configured to accommodate lips of a user in use. It will be appreciated that in other examples not shown, the side wall part 32 may have a different shape; for example the side wall part 32 may comprise flat surfaces rather than rounded surfaces. Furthermore, in other examples the side wall part 32 may not flare.

The side wall part 32 defines a channel 34 within which a flavorant 36 may be housed or retained. The housing for the receptacle 8 also includes two ends, defining the inlet and outlet of channel 34, to allow the inhalable medium (e.g. vapor, aerosol and/or air) drawn along the air path 52 during use to pass through the flavoring material 36 and so pick up flavors (for example tobacco flavors) before exiting the receptacle though mouthpiece outlet 50 for user inhalation. The housing is further configured to provide a plurality of protrusions 64 for providing contact with a surface of the receiving portion 54. The housing is also configured to provide a recess 62 for a user to grip when removing the receptacle 8 from the cartridge part or engaging a receptacle 8 with the cartridge part.

The receptacle 8 of FIGS. 2A, 2B and 2C comprises a mouthpiece, a sidewall part 32 and the outlet wall part 70 which are provided as a single integrally formed component. The integrally formed component may be formed by integrally molding the mouthpiece, the side wall part 32, and the outlet wall part 70 using a single mold. The component may be formed using injection molding or any other convention process. For example, the component may be integrally formed an additive manufacturing process such as top-down or bottom-up 3D printing of a suitable material. In some examples, a casting process may be used.

The outlet wall part 70 has a plurality of holes for allowing air to pass from one side of the outlet wall part to the other side of the outlet wall part. The outlet wall part 70 is provided at the mouthpiece outlet 50 end of the channel 34 formed by the side wall part 32. The outlet wall part 70 may be inset slightly from the end of the channel 34 and may define a planar surface. As shown in FIG. 2B, the plurality of holes may be formed by providing a series or array of parallel bars. A second series or array of parallel bars may be provided adjacent and anti-parallel to the first series of parallel bars, to provide a grid array of holes. It will be appreciated that the first and second series of bars may be regularly spaced and that the holes defined by the bars may have a regular pattern (e.g. spacing) dependent on the periodicity of the first and second series of bars.

The angle between the two sets of bars defines the shape of the holes. For example, if the angle is 90° the holes will be square or rectangle, while if the angle is less than 90° the holes will be parallelograms. It will be appreciated that different arrangements of bars may be used to form differently shaped holes in the outlet wall part and that embodiments are not limited to holes shaped as squares, rectangles or parallelograms. In some examples, curved parallel bars may be provided. Curved parallel bars may provide holes having curved edges and also having corners where the bars intersect.

In some examples, the outlet wall part 70 may be configured to provide holes which have a diameter of between 0.2 mm and 1 mm, such as between 0.3 mm and 0.7 mm and for example 0.4 mm. An outlet wall part 70 in accordance with these examples may allow vapor to infiltrate through a flavoring material 36 whilst retaining the flavoring material (for example, loose tobacco or tobacco granules) within the receptacle 8. It will be appreciated that the preferred diameter of the holes is dependent on the size and configuration of the flavoring material 36 that is to be retained within the receptacle 38. For example, the size and configuration of the holes may depend on whether the flavoring material 36 is provided as a single piece or as a plurality of pieces, and based on the dimensions of the piece or pieces. In an example where the flavoring material 36 is provided as a plurality of pieces, the size of the holes may be smaller than 90% of the plurality of pieces, such as smaller than 95% of the plurality of pieces.

The side wall part 32 may be further configured to define a retention mechanism 60 for retaining a channel inlet wall part 40 (not shown) within the end of the channel 34 opposite to the mouthpiece outlet end 50. By retention mechanism it is meant a mechanism for retaining a channel inlet wall part 40 within the channel 34. In other words the retention mechanism 60 blocks or otherwise prevents the channel inlet wall part 40 from exiting the channel 34 after insertion. It will be appreciated that the channel inlet wall part 40 is prevented from exiting the channel 34 via the end having the channel outlet wall part 70, due to the presence of the channel outlet wall part 70, and/or due to a flavor material which may be present in the channel 34 in normal use.

As shown in FIGS. 2B and 2C, the retention mechanism 60 may comprise a plurality of tabs. The tabs are configured to fold upwards upon the application of pressure (and optionally heat) to point inwardly towards a center of channel 34. In use, the inlet wall part 40 is inserted into the channel 34 formed by the side wall part 32, and then the retention mechanism 60 is adjusted to narrow the diameter of the channel 34 upstream of the inlet wall part, such that the inlet wall part 40 is prohibited from exiting the channel 34. It will be appreciated that the inlet wall part 40 is configured to have a shape which is small enough to be inserted into channel 34, but large enough that it is retained by the retention mechanism 60 once it has been engaged/activated/modified. As an example, the lower opening of the channel 34 may have an elliptical shape with a minor axis diameter of 1.00 cm and a major axis diameter of 2.00 cm. The tabs of the retention mechanism 60 may be folded inward, as described, to form an aperture having an elliptical shape with a minor axis diameter of 0.80 cm and a major axis diameter of 1.80 cm. For such an example the inlet wall part 40 may have an elliptical shape with a minor axis diameter of about 0.95 cm and a major axis diameter of 1.95 cm.

In other examples (not shown) the retention mechanism 60 may be established in accordance with conventional techniques, for example based around a screw thread, clip or latch mechanism. Alternatively or additionally, the retention mechanism 60 may use an adhesive or ultrasonic welding to adhere the inlet wall part 40 to the housing. This may be in place of or in addition to the tabs shown in FIGS. 2A, 2B and 2C.

As described above, the receptacle 8 may be formed by a single integrally-formed side wall part 32 which defines the mouthpiece, the side walls of channel 34 and the outlet wall part 70, and a separate inlet wall part 40. This allows for a simplified manufacturing process, whereby it is only necessary to combine two components (the side wall part 32 and the inlet wall part 40) after flavoring material 36 is provided in the channel 34, rather than combining a larger number of components in a complicated manufacturing process.

FIGS. 3A and 3B show a receptacle 8 in accordance with the example vapor delivery system 1 of FIG. 1. FIG. 3A provides a perspective drawing while FIG. 3B provides a view of a cross-section through a receptacle 8, the plane of the cross-section being perpendicular to a longitudinal axis of the device. In contrast to the receptacle 8 of FIGS. 2A, 2B and 2C, the side wall part 32 of receptacle 8 of FIGS. 3A and 3B is shaped to define a liquid collecting area for collecting liquid. Aspects of FIGS. 3A and 3B which are substantially similar to those shown in FIGS. 2A, 2B and 2C will not be described in detail.

Vapor retained in the receptacle may condense as a liquid on the flavoring material 36 or on the side walls forming channel 34. For example, when a user stops drawing on the device, vapor may cease moving towards the mouthpiece outlet 50 and may begin to cool. Condensed liquid may adhere to the surface of walls of the receptacle 8 due to surface tension. The liquid may be drawn towards a user's mouth during an inhalation The liquid may collect in regions where the flow of liquid is impeded; for example, due to an impermeable wall. As shown in FIGS. 3A and 3B, a liquid collecting area or region for collecting liquid, provided as a recess or trough 90, may be provided in the channel 34 close to the mouthpiece outlet 50. For example, the recess 90 may be provided by the intersection of the side wall part 32 and the outlet wall part 70.

The receptacle 8 (for example, the outlet wall part 70 of the receptacle 8) may define a depression towards the center of the receptacle which is substantially in line with the airflow direction, in use. This airflow direction may align with a longitudinal axis of the receptacle 8. By depression it is meant that a central region of the receptacle 8 is closer to the center of the receptacle 8 than a peripheral region of the receptacle 8. As shown in FIG. 3A the peripheral region of the mouthpiece end of receptacle 8 may form an oval shape, which may be define a mouthpiece outlet 50. The plurality of openings of the outlet wall part 70 may be provided in a planar wall portion in a central region of the depression perpendicular to the airflow direction. The depression has an internal surface (i.e. an upstream surface facing within the receptacle) and an external surface (i.e. a downstream visible to the user in normal use).

As shown in FIG. 3B, the recess 90 may be provided as a trough (for example, a U-shape trough or a V-shape trough) formed by the side wall part 32 and the channel outlet wall part 70. The portion of the channel outlet wall part 70 forming the trough may be the internal surface of the depression forming a peripheral region which does not include any of the plurality of openings. In some examples a trough or recess 90 may be formed at the intersection of the channel outlet wall 90 with the side wall 34. For example, a portion of the outlet wall part 70 may intersect the side wall 34 at an angle of less than 90°. It will be appreciated that by having an angle of less than 90°, a V shape may be considered to be defined by the outlet wall part 70 and side wall 34. In other examples, the intersection between the outlet wall part 70 and the side wall 34 may be smoothed or rounded such that a shape closer to a U-shape is provided. In further examples, the outlet wall part 70 and the side wall 34 may include parallel portions such that a U-shape trough is provided. It will be appreciated that the trough or recess 90 may be provided in many different forms.

In some examples, the trough or recess 90 may be formed only at a portion of the intersection between the channel outlet wall part 70 and the side wall 34. For example, a second length of the circumference of the outlet wall part 70 may have an intersection angle or more than 90° over a portion not forming the first length and/or by having openings of the plurality of openings adjacent to the intersection in the second length, such that liquid can flow substantially unimpeded towards the mouthpiece outlet 50. In these examples the liquid collection area may be a trough having an elongated configuration, or may be a recess having more of a bowl shape. The curvature of the walls surrounding the trough or recess 90 may promote the flow of liquid condensate towards the trough or recess 90. In some examples, the trough or recess 90 may be formed around the whole of the intersection between the channel outlet wall part 70 and the side wall part 32 (in other words, around the whole of the circumference of the channel outlet wall part 70).

The recess 90 is open on one side to allow liquid to enter the recess (e.g. the upstream side). In some examples the recess 90 may have a depth, typically parallel to the airflow direction, of between 1 mm and 5 mm, such as between 2 mm and 4 mm, and for example 3 mm. The recess may have a liquid volume capacity of between 0.2 ml and 1 ml, such as between 0.3 ml and 0.5 ml.

Channel 34 may be configured to provide one or more internal liquid guiding ridges or channels 80. Ridges or channels 80 aid or promote the movement of liquid within the receptacle 8 towards the recess 90 and/or away from the plurality of openings. It will be appreciated that ridges and channels may be used interchangeably to describe liquid guiding features. For example, a liquid guiding channel may be considered to be formed by the facing edges of two liquid guiding ridges, and similarly a liquid guiding ridge may be considered to be formed by the facing edges of two liquid guiding channels.

Ridges or channels 80 are typically provided parallel to the airflow direction in normal use, as shown in FIG. 3B. In other examples, not shown, the side wall part 32 may be configured to provide ridges and channels 80 which are not parallel. In some other examples, the channel 34 may be configured to provide ridges and channels which are curved. In most examples, the ridges or channels 80 terminate within or adjacent to the recess 90. Curved channels may be advantageous where a recess or trough 90 is only provided around a portion of the channel outlet wall part 70, such that the liquid can be guided to the recess or trough 90. In some examples, the external surface of the side wall part 32 adjacent to the channel outlet wall part 70 may have exterior channels 82 (i.e. channels on an exterior surface of the receptacle). In some examples, the channel outlet wall part 70 may also be provided with channels 80 and/or external channels 82. Liquid guiding channels 80 of the channel outlet wall part 70 may also promote or aid the flow or movement of liquid towards recess and/or trough 90.

FIGS. 4A and 4B show a receptacle 8 in accordance with the example vapor delivery system 1 of FIG. 1. FIG. 4A provides a perspective drawing while FIG. 4B provides a view of a cross-section through a receptacle 8, the plane of the cross-section being perpendicular to a longitudinal axis of the device. In contrast to the receptacle 8 of FIGS. 3A and 3B, the channel outlet wall part 70 of the receptacle 8 of FIGS. 4A and 4B is formed in a non-planar region 72 of the receptacle 8 such that the plurality of openings of the channel outlet wall part 70 are provided on a non-planar surface. Aspects of FIGS. 4A and 4B which are substantially similar to those shown in FIGS. 3A and 3B will not be described in detail.

Configuring the housing 23 to define a non-planar region 72 provides an increased surface area in contrast to a planar region. For example, it will be appreciated that a circular surface has a surface area of $\pi*radius^2$ whilst a hemispherical surface has a surface area of $2*\pi*radius^2$. By providing a three-dimensional surface, the surface area of the channel outlet wall part 70 is increased with respect to a channel outlet wall having a two dimensional surface, dependent upon the extent of the surface in the third dimension.

The non-planar region 72 is bounded by the peripheral region of the mouthpiece outlet 50. The non-planar region 72 may have a continuously curved surface. The non-planar region may define a surface which continuously curves within the boundaries of the peripheral region, such that the non-planar region and the peripheral region form a bowl or concave shape. The curved surface of the non-planar region may vary and may be defined by a radius of curvature. In some examples the non-planar region 72 may have a greater radius of curvature closer to the peripheral region and a lesser radius of curvature further from the peripheral region. Furthermore, in some examples, the non-planar region 72 may have different radius of curvature in a first plane and a second plane. For example, as shown in FIG. 4A the mouthpiece outlet 50 may have an elliptical shape. The radius of curvature in the plane defined by the major axis of the ellipse and the airflow direction has a smaller radius of curvature than the radius of curvature in the plane defined by the minor axis of the ellipse and the airflow direction.

In some examples, a radius of curvature for the non-planar region has a range selected from the group comprising 0.3 cm to 3.0 cm, 0.3 to 2.5 cm, 0.3 cm to 2.0 cm, 0.3 cm to 1.5 cm and 0.3 cm to 1.0 cm, the radius of curvature in a first plane, the first plane perpendicular to an airflow direction during normal use. In some examples, the first plane may be defined by an axis of the shape of the peripheral portion of the mouthpiece outlet 50, as well as an axis of the airflow direction. For example, the axis of the shape may be a major or minor axis of an ellipse defined by the peripheral portion.

In some examples, a second radius of curvature for the non-polar region has a range selected from the group comprising 0.3 cm to 3.0 cm, 0.3 to 2.5 cm, 0.3 cm to 2.0 cm, 0.3 cm to 1.5 cm and 0.3 cm to 1.0 cm, the second radius of curvature about an axis perpendicular to both the airflow direction during normal use and the first plane (for example, it could be considered that the airflow direction defines a first axis, the normal to the first plane defines a second axis, and a third axis is perpendicular to the first and second axes, with the second radius of curvature being defined relative to the third axis). It will be appreciated that in some examples the second radius of curvature of the continuously curved surface is substantially infinite in relation to a second axis such that the non-planar surface is flat or effectively not curved about the axis perpendicular to both the airflow direction during normal use and the first plane.

Figure 5:
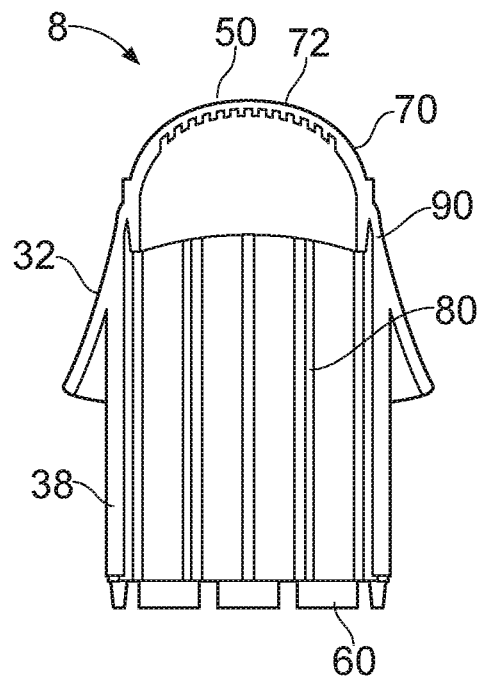

FIG. 5 provides a view of a cross-section through a receptacle 8 in accordance with the example vapor delivery system 1 of FIG. 1, the plane of the cross-section being perpendicular to a longitudinal axis of the device. In contrast to the receptacle 8 of FIG. 4B, the side wall part 32 does not define a depression and instead the non-planar surface 72 of the channel outlet wall part 70 of the receptacle 8 of FIG. 5 curves outwardly from a center of the receptacle 8. Aspects of FIG. 5 which are substantially similar to those shown in FIG. 4B will not be described in detail.

The mouthpiece outlet 50 of the receptacle 8 depicted in FIG. 5 provides a convex shape, with respect to the internal region of the receptacle 8. Similarly to FIGS. 4A and 4B, the configuring of the side wall part 32 to define a non-planar region 72 provides an increased surface area in contrast to a planar region. In contrast to FIGS. 4A and 4B, the side wall part 32 defines an external surface of a mouthpiece including a central region furthest from the center of the receptacle 8, and a peripheral region surrounding the central region. The peripheral region may be approximately adjacent the end of channel 34 and/or a recess 90 for collecting liquid.

The recess 90 may be provided as a trough (for example, a U-shape trough or a V-shape trough) surrounding either the whole of the circumference of the channel 34 or a portion of the circumference of the channel 34. The intersection of the channel outlet wall part 70 and the side wall part 32 may provide the recess. The channel outlet wall part 70 may be provided at an angle to the side wall part 32 such that the recess is defined by the channel outlet wall part 70 and the side wall part 32, with the recess 90 open on one side to allow liquid to enter the recess. In some examples, the recess may be defined by additional wall features extending from either the outlet wall part 70 or the side wall part 32. In some examples the recess 90 may have a depth, typically parallel to the airflow direction, of between 1 mm and 5 mm, such as between 2 mm and 4 mm, for example 3 mm. The recess may have a liquid volume capacity of between 0.2 ml and 1 ml, such as between 0.3 ml and 0.5 ml.

In some examples in accordance with FIG. 5, a radius of curvature for the non-planar region has a range selected from the group comprising 0.3 cm to 3.0 cm, 0.3 to 2.5 cm, 0.3 cm to 2.0 cm, 0.3 cm to 1.5 cm and 0.3 cm to 1.0 cm, the radius of curvature in a first plane, the first plane perpendicular to an airflow direction during normal use. In some examples, the first plane may be defined by an axis of the shape of the peripheral portion of the mouthpiece outlet 50, as well as an axis of the airflow direction. For example, the axis of the shape may be a major or minor axis of an ellipse defined by the peripheral portion.

In some examples in accordance with FIG. 5, a second radius of curvature for the non-polar region has a range selected from the group comprising 0.3 cm to 3.0 cm, 0.3 to 2.5 cm, 0.3 cm to 2.0 cm, 0.3 cm to 1.5 cm and 0.3 cm to 1.0 cm, the second radius of curvature about an axis perpendicular to both the airflow direction during normal use and the normal of the first plane. It will be appreciated that in some examples the second radius of curvature of the continuously curved surface is substantially infinite in relation to a second axis such that the non-planar surface is effectively not curved about the axis perpendicular to both the airflow direction during normal use and the normal of the first plane.

Figure 6:
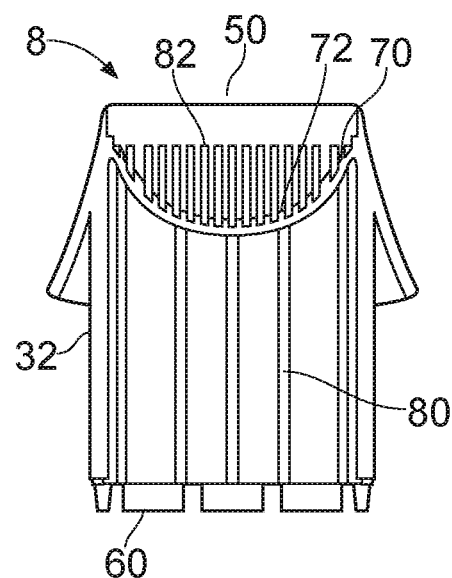

FIG. 6 provides a view of a cross-section through a receptacle 8 in accordance with the example vapor delivery system 1 of FIG. 1, the plane of the cross-section being perpendicular to a longitudinal axis of the device. In contrast to the receptacle 8 of FIG. 4B, the side wall part 32 does not define a recess 90 for collecting liquid. Aspects of FIG. 6 which are substantially similar to those shown in FIG. 4B will not be described in detail.

In FIG. 6, the non-planar region 72 having the plurality of holes may extend to the edge of the channel 34 such that a recess for collecting liquid is not formed. A larger surface area is provided for the plurality of holes as a result. Furthermore, this may facilitate a more even flow of air throughout the channel 34 and avoid concentrating the flow of air in a central region.

Figure 7:
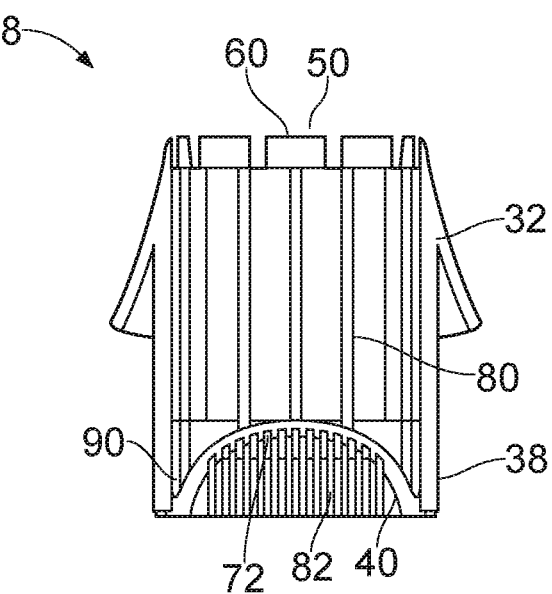

FIG. 7 provides a view of a cross-section through a receptacle 8 in accordance with the example vapor delivery system 1 of FIG. 1, the plane of the cross-section being perpendicular to a longitudinal axis of the device. In contrast to the receptacle 8 of FIG. 4B, the receptacle 8 comprises a side wall part 32, a mouthpiece, and an inlet wall part 40 (rather than an outlet wall part 70) formed as a single integrally formed component. Aspects of FIG. 6 which are substantially similar to those shown in FIG. 4B will not be described in detail.

Similarly to the examples above, the integrally formed component may be formed by integrally molding the mouthpiece, the side wall part and the inlet wall part 40 using a single mold. The component may be formed using injection molding or any other convention process. For example, the component may be integrally formed an additive manufacturing process such as top-down or bottom-up 3D printing of a suitable material. In some examples, a casting process may be used.

As shown in FIG. 7, the inlet wall part 40 may include non-planar region 72 having a plurality of holes. Configuring the housing 23 to define a non-planar region 72 provides an increased surface area in contrast to a planar region. For example, it will be appreciated that a circular surface has a surface area of $\pi*radius^2$ whilst a hemispherical surface has a surface area of $2*\pi*radius^2$. By providing a three dimensional surface, the surface area of the channel inlet wall part 40 is increased with respect to a channel inlet wall having a two dimensional surface, and sharing two dimensions, dependent upon the extent of the surface in the third dimension.

The non-planar region 72 is bounded by the peripheral region at the base of the insertion portion 38. The non-planar region 72 may have a continuously curved surface. The non-planar region may define a surface which continuously curves within the boundaries of the peripheral region, such that the non-planar region and the peripheral region form a bowl or concave shape. The curved surface of the non-planar region may vary and may be defined by a radius of curvature. In some examples the non-planar region 72 may have a greater radius of curvature closer to the peripheral region and a lesser radius of curvature further from the peripheral region. Furthermore, in some examples, the non-planar region 72 may have different radius of curvature in a first plane and a second plane.

An outlet wall part 70 may be provided after filling of the receptacle 8 with the flavor material 36. The side wall part 32 may be further configured to define a retention mechanism 60 for retaining a channel outlet wall part 70 (not shown) within the end of the channel 34 opposite to the end having the channel outlet wall part 70. By retention mechanism it is meant a mechanism for retaining a channel outlet wall part 70 within the channel 34. In other words the retention mechanism 60 blocks or prevents the channel outlet wall part 70 from exiting the channel 34 after insertion. It will be appreciated that the channel outlet wall part 70 is prevented from exiting the channel 34 by the end having the channel inlet wall part 40, due to the presence of the channel inlet wall part 40.

Similarly to the retention mechanism of FIGS. 2B and 2C, the retention mechanism 60 may comprise a plurality of tabs. The tabs are configured to fold upwards upon the application of pressure (and optionally heat) to point inwardly towards a center of channel 34. In use, the outlet wall part 70 is inserted into the channel 34 formed by the side wall part 32, and then the retention mechanism 60 is adjusted to narrow the diameter of the channel 34 such that the outlet wall part 70 is prohibited from exiting the channel 34. It will be appreciated that the outlet wall part 70 is configured to have a shape which is small enough to be inserted into channel 34, but large enough that it is retained by the retention mechanism 60.

In other examples, not shown, the retention mechanism 60 may be established in accordance with conventional techniques, for example based around a screw thread, clip or latch mechanism. Alternatively or additionally, the retention mechanism 60 may use an adhesive or ultrasonic welding to adhere the inlet wall part 40 to the housing. This may be in place of the tabs shown in FIG. 7.

FIG. 8 provides a view of a cross-section through a receptacle 8 in accordance with the example vapor delivery system 1 of FIG. 1, the plane of the cross-section being perpendicular to a longitudinal axis of the device. In contrast to the receptacle 8 of FIG. 4B, the non-planar region 72 having the plurality of holes comprises a planar or flat central region 73 and curved region 74. Aspects of FIG. 8 which are substantially similar to those shown in FIG. 4B will not be described in detail.

Examples of the non-planar region 72 may comprise a planar region 73 and at least one other curved adjacent region 74 bordering the planar region 73. As shown in FIG. 8, the planar region 73 comprises a central portion of the outlet wall part 70, and the at least one adjacent curved region 74 surrounds or borders at least part of the central portion. In some examples, the planar region 73 defines a central circular or elliptical portion of the non-planar region 72 and the non-planar adjacent region defines a non-planar surface extending from the edge of the circular or elliptical surface. As an example, the curved adjacent region 74 may be a ring surrounding a central circular portion of planar region 73.

In other examples, the planar portion 73 may comprise a surface having a polygonal shape with a number of edges (for example, the surface may be square). A curved surface 74 extends from an edge of the planar surface 73. A second adjacent curved surface 74 may extend from a different edge of the surface, for example an opposing edge of the surface (i.e. a parallel edge of a square). In some examples, the adjacent curved surfaces or portions 74 may not be adjacent to each other. For examples the adjacent curved surfaces 74 may be connected by a wall which does not include any of the plurality of holes of the non-planar region 72.

While the example of FIG. 8 depicts that a central region of the outlet wall part 70 has a planar or flat surface; in other examples, the central region may have a curved surface and one or more adjacent regions may have a flat surface. It will be appreciated that the outlet wall part 70 can be configured to provide a variety of different curved and planar surfaces dependent on particular requirements.

FIG. 9 provides a view of a cross-section through a receptacle 8 in accordance with the example vapor delivery system 1 of FIG. 1, the plane of the cross-section being perpendicular to a longitudinal axis of the device. In contrast to the receptacle 8 of FIG. 4B, the non-planar region 72 having the plurality of holes comprises a plurality of planar region 73, each of which defines a surface having a normal which is non-parallel with any other surface of the plurality of planar regions 73. Aspects of FIG. 9 which are substantially similar to those shown in FIG. 4B will not be described in detail.

In some examples the non-planar portion 72 may be formed from a plurality of planar portions each of which defines a surface having a plane which is different to the planes defined by surfaces of the other portions.

In other examples, the planar portion 73 may comprise a surface having a polygonal shape with a number of edges (for example, the surface may be square). An adjacent curved surface 74 extends from an edge of the surface. A second adjacent curved surface 74 may extend from a different edge of the surface, for example an opposing edge of the surface (i.e. a parallel edge of a square). In some examples, the adjacent curved surfaces 74 may not be adjacent to each other. For example, the adjacent curved surfaces 74 may be connected by a wall which does not include any of the plurality of holes of the non-planar region 72.

FIG. 10 provides a top-down view of a receptacle 8 in accordance with the example receptacle 8 of FIG. 9. Aspects of FIG. 10 which are substantially similar to those shown in FIG. 9 will not be described in detail. By top down it is meant that the view is in the plane perpendicular to the airflow direction in normal use. In other words, it is a view in a plane perpendicular to a longitudinal axis of the receptacle 8.

In the example shown the non-planar portion 72 comprises a set of seven planar portions 73. A central planar portion defines a surface having a hexagonal shape. From each of the six sides of the hexagonal central portion, extends one of the other six planar portions. Each of the planar portions 73 defines a surface extending from the central planar portion to the edge of the mouthpiece outlet 50 defined by the side wall part 32. The planes of each of the planar portions surrounding the central portion are angled with respect to the central portion such that none of the planar portions 73 define a normal which is parallel with a normal of any of the other planar portions 73.

In some examples, the plurality of holes of the non-planar region 72 may be regularly spaced over each of the planar portions 73. In other examples, one or more of the planar portions 73 may have a greater density of holes. For example, the planar portion 73 provided in the center of the non-planar surface may have a greater or lesser density of holes in comparison to a planar portion around the outside of the non-planar region 72. It will be appreciated that in other examples, not shown, there may be other arrangements of planar portions 73 to provide the non-planar region 72. For example there may be no central region, or the central region may have a different number of edges, for example between 3 and 12 edges.

FIG. 11 provides a top-down view of a receptacle 8 in accordance with the example receptacle 8 of FIG. 8. Aspects of FIG. 11 which are substantially similar to those shown in FIG. 8 will not be described in detail. By top down it is meant that the view is in the plane perpendicular to the airflow direction in normal use. In other words, it is a view in a plane perpendicular to a longitudinal axis of the receptacle 8.

As shown, the plurality of holes of the non-planar region 72 may be arranged concentrically around a center of the non-planar region 72. The center of the non-planar region 72 may a center of a longitudinal axis through the device around which there is at least one degree of symmetry. In some examples, the longitudinal axis may also be a center of the airflow, in normal use. In some examples, the density of the holes may be constant over the non-planar region. In other examples, the density of the holes may increase or decrease with distance from the center.

FIG. 12 provides a view of a section of the mouthpiece outlet 50 and a portion of side wall part 32 in accordance with the example vapor delivery system 1 of FIG. 1. Certain aspects of FIG. 12 are substantially similar to those shown in the preceding Figures and will not be described in detail again.

The example mouthpiece outlet 50 of FIG. 12 depicts the position of the plurality of holes of the non-planar region 72. As stated above, the outlet wall part 70 has a plurality of holes for allowing air to pass from one side of the outlet wall to the other side of the outlet wall. The outlet wall part 70 is provided at the mouthpiece outlet 50 end of the channel 34 formed by the side wall part 32. The outlet wall part 70 is inset slightly from the end of the channel 34. The side wall part 32 and the outlet wall part 70 may further define a recess 90 for retaining liquid.

As shown the outlet wall part 70 comprises a non-planar region 72 having a plurality of holes or openings 77. Each of the openings are provided parallel to a longitudinal axis of the receptacle 8. The longitudinal axis aligning substantially with an airflow direction through the receptacle 8 in normal use.

FIG. 13 provides a view of a section of the mouthpiece outlet 50 and a portion of side wall part 32 in accordance with the example vapor delivery system 1 of FIG. 1. Certain aspects of FIG. 13 are substantially similar to those shown in the preceding Figures and will not be described in detail again.

The example mouthpiece outlet 50 of FIG. 13 depicts the position of the plurality of holes of the non-planar region 72. As stated above, the outlet wall part 70 has a plurality of holes for allowing air to pass from one side of the outlet wall to the other side of the outlet wall. The outlet wall part 70 is provided at the mouthpiece outlet 50 end of the channel 34 formed by the side wall part 32. The outlet wall part 70 is inset slightly from the end of the channel 34. The side wall part 32 and the outlet wall part 70 may further define a recess 90 for retaining liquid.

As shown the outlet wall part 70 comprises a non-planar region 72 having a plurality of holes or openings 77. Each of the openings 77 comprises a bore through the outlet wall, the bore having a longitudinal axis parallel to a normal of the non-planar region as the location of the respective opening. This may aid the flow of air from peripheral regions of the flavor material 36.

Figure 14:
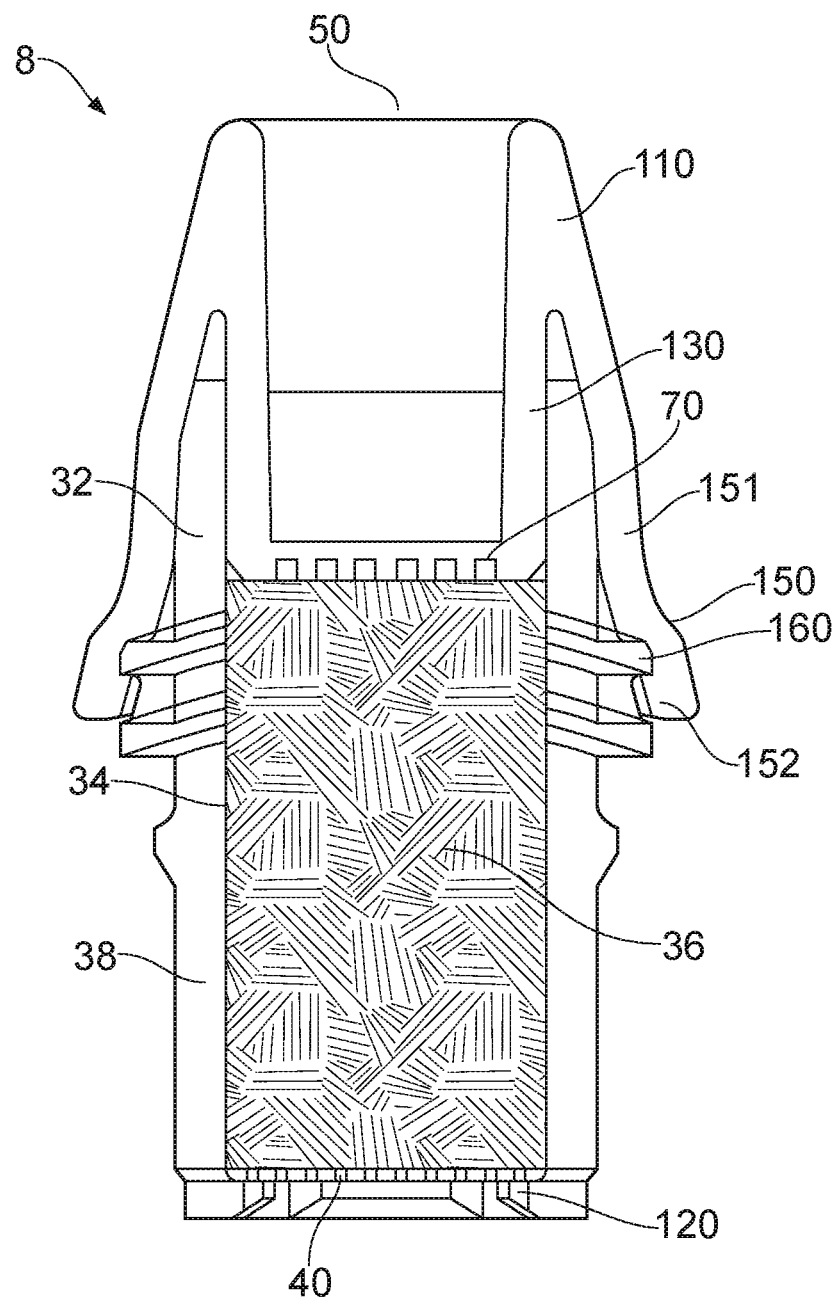
FIG. 14 schematically represents in cross-section a receptacle, including a flavor material, for use with an aerosol delivery system in accordance with certain embodiments of the disclosure.

FIG. 14 provides a view of a cross-section through a receptacle 8 in accordance with the example vapor delivery system 1 of FIG. 1, the plane of the cross-section being perpendicular to a longitudinal axis of the receptacle 8. Aspects of FIG. 14 which are substantially similar to those shown in the preceding Figures will not be described in detail.

The side wall part 32 may comprise a shelf or lip 120 which is configured to prevent the movement of the inlet wall part 40 in a direction. For example, the inlet wall part 40 may be inserted into the channel 34 from the mouthpiece outlet 50 end. The inlet wall part 40 may move within the channel 34 between the mouthpiece outlet 50 and the lip 120, however the inlet wall part 40 may not move past the lip 120. As such, the inlet wall part 40 may be mounted to the side wall part 32 using the lip 120.

The lip or shelf 120 may be formed by one or more protrusions extending inwardly from the side wall part 32 forming the channel 34. As such the lip or shelf 120 is configured to block the movement of the inlet wall part 40 to retain the inlet wall within the channel thereby supporting the position of the inlet wall part 40 within the receptacle 8. In some examples, the inlet wall part 40 may additionally be connected to the side wall part 32 via ultrasonic welding, adhesive or any other conventional technique, to further support the positioning of the inlet wall part 40.

In other examples, the side wall part 32 and the inlet wall part 40 may be integrally formed, for example, by injection molding using a single mold or by 3D printing a single component. In these other examples the receptacle 8 may or may not comprise a lip 110. Furthermore, while the inlet wall part 40 of FIG. 14 is planar or flat, in other examples the inlet wall part 40 may be non-planar and may, for example, be configured as described FIG. 7 and the associated embodiments.

The receptacle 8 comprises a side wall part 32, a mouthpiece element 110, an outlet wall part 70 and an inlet wall part 40. The mouthpiece element 110 is either integrally formed with or otherwise connected to the outlet wall part 70. For example, the mouthpiece element 110 may be integrally formed with the outlet wall part 70 using a single mold, or the mouthpiece element 110 and the outlet wall part 70 may be formed separably and connected to form a single component via ultrasonic welding, adhesive or any other conventional technique. The receptacle 8 comprises a side wall part 32 defining a channel 34 within which a flavor material 36 may be provided.

In the example of FIG. 14, the outlet wall part 70 comprises a channel insertion part 130 which is inserted into channel 34 of the receptacle 8 when the outlet wall part 70 is attached to the side wall part 32 (for example, by attaching the mouthpiece element 110 to the side wall part 32). The outlet wall part 70 may be provided at a base of the channel insertion part 130, as shown. The channel insertion part 130 is configured to have a shape closely matching and slightly smaller that the portion of the channel 34 in which it is inserted, such that when the channel insertion part 130 is inserted into the channel, the channel insertion part 130 fits closely to (i.e. an interference fit, such that it fits tightly with) the side walls of the channel 34. As an example, the channel insertion part 130 and channel 34 may be cylindrical and the diameter of the channel insertion part 130 may be only slightly less than that of the channel 34. The outlet wall part 70 may be provided as a circular portion capping the cylinder formed by the channel insertion portion 130. It will be appreciated that the configuration of the channel 34 and the channel insertion portion 130 may be provided in a variety of corresponding shapes, whilst still enabling a close fit between the channel 34 and the channel insertion portion 130. Furthermore, while the outlet wall part 70 of FIG. 14 is planar or flat, in other examples the outlet wall part 70 may be non-planar and may, for example, be configured as described FIGS. 4A, 4B, 5, 6, and 8 to 13 and the associated embodiments.

In some examples, the side wall part 32 and the mouthpiece element 110 may be releasably coupled together. When the flavoring material 36 within the receptacle 8 is exhausted or the user simply wishes to switch to a different flavoring material, the mouthpiece element 110 may be detached from the side wall part 32 and the flavoring material 36 may be replaced within the channel 34. The side wall part 32 and the mouthpiece element 110 may be coupled together such that a structural connection between the two parts is established. In the example of FIG. 14, the retention of the mouthpiece element 110 with respect to the side wall part 32 is facilitated by a latching elements or clips 150 and corresponding latch members 160 for receiving portions of the latching elements 150.

The mouthpiece element 110 may comprise a pair of latching elements 150. The two latching elements 150 are oppositely disposed, one on each side of the mouthpiece element 110. A latching element 150 comprises a foot part 152 and a leg part 151. In the current example, the leg 151 is a substantially elongate elements and the foot 152 is an element protruding from an end of the leg 151 substantially at 90 degrees to the elongate axis of the leg 151. The flexibility of the leg 151 allows movement of the foot 152 with respect to the remainder of the mouthpiece element 110 (such as the channel insertion portion 130) when an external force is applied to the leg 151. The movement of the leg 151 (and the consequently the foot) may be considered a hinged movement that increases or decreases the angle of the leg 151, with respect to the remainder of the mouthpiece element 110, from a rest position. The resilience of the leg 151 returns the angle to its original size when the force is removed, maintaining the usual shape of the latching element.

The latching element 150 is secured to the side wall part 32 so that the leg 151 and foot 152 extends beyond the upper face of the housing. In other words, a portion of the side wall part 32 and, at least, the leg 151 overlap in a longitudinal direction of the receptacle 8. The latching element 150 may be secured by anchoring the foot part 152 within the latch member 160. The foot part 152 lies generally in the plane of the latch members 160. The latch member 160 is shaped to receive the foot part 152, for example there is a hole or recess formed by protrusions of the latch member 160 extending from the side edge of the side wall part 32 into which the foot part 152 is inserted. For example, the side wall part 32 may be molded or otherwise include shaped parts formed from rigid plastic which engage around the foot part to house it and hence hold it in place.

In other examples, not shown, the mouthpiece element 120 may be mechanically or chemically coupled to the side wall part 32 in accordance with conventional techniques, for example based around a screw thread, latch mechanism, or bayonet fixing openings for establishing the electrical connection and air path between the two parts as appropriate. In some examples, the foot part 152 may be anchored by screws or rivets attached through the latching element 150 and into the side wall part 32, or by being glued or welded to the housing. It will be appreciated that in these examples, the side wall part 32 and the mouthpiece element 110 may not be intended to be releasably coupled together.

Figure 15:
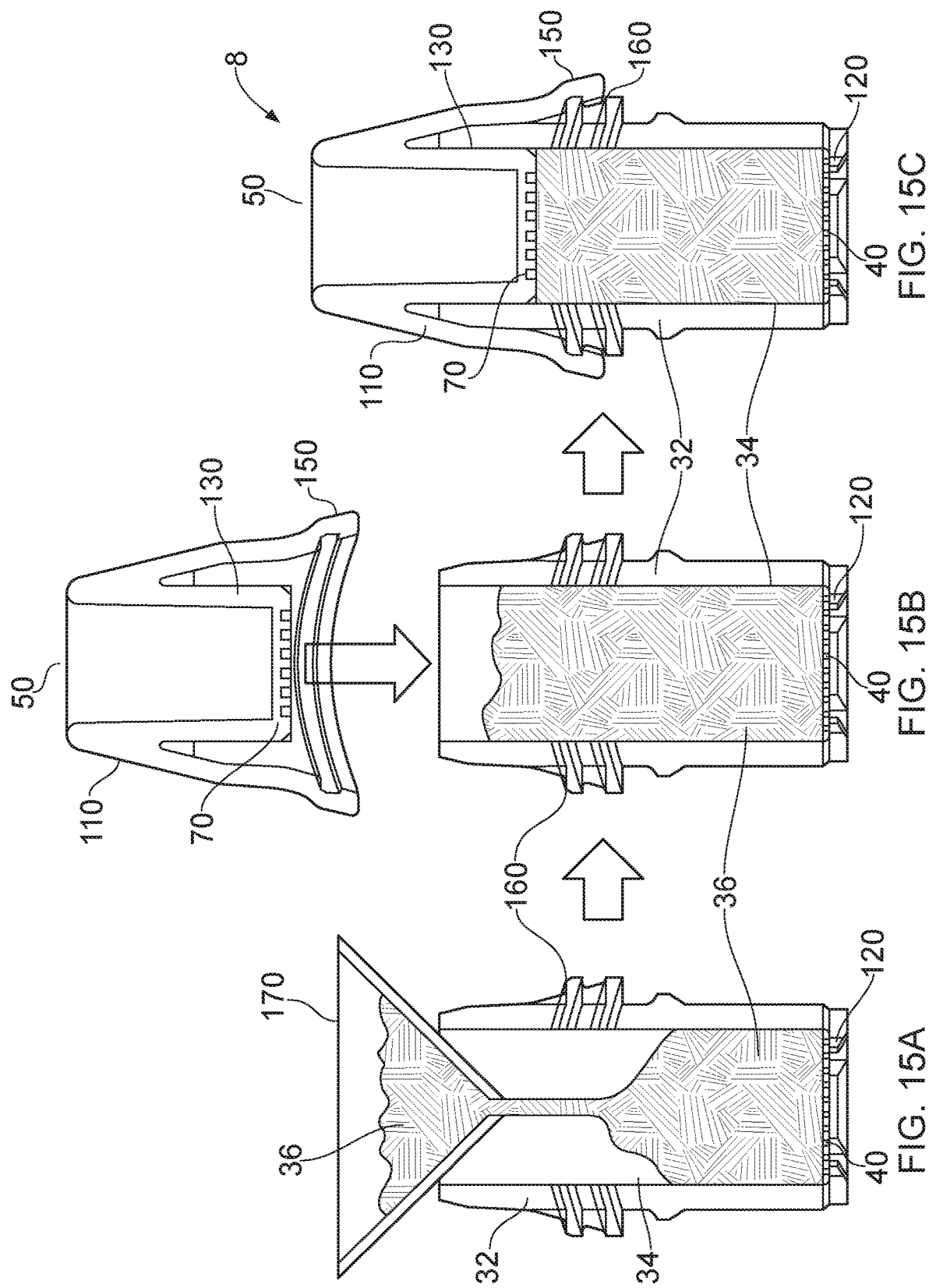
FIGS. 15A to 15C schematically represents a method of filling a receptacle, in accordance with the example of FIG. 14, with a flavor material in accordance with certain embodiments of the disclosure.

FIGS. 15A to 15C provide a sequence of cross-sectional views in accordance with the example receptacle 8 of FIG. 14, depicting filling of the receptacle with a flavor material and attaching of the mouthpiece element 110 to the side wall part 32. Aspects of FIGS. 15A to 15C which are substantially similar to those shown in FIG. 14 will not be described in detail.

The receptacle 8 is configured to retain the flavor material 36 in the channel 34 between the inlet wall part 40, the outlet wall part 70. As shown in FIG. 15A, the receptacle 8 is intended to be substantially filled with an amount of flavor material 36 after the inlet wall part 40 has been provided within the channel 34. The inlet wall part 40 may be retained in the channel 34, for example, due to the orientation of the receptacle 8 and the lip 120 (i.e. by gravity), or by any other means (e.g. glue or welding). The flavor material 36 may then be provided into the receptacle 8 through the open outlet end of the channel 34. Filling of the receptacle 8 with the flavor material 36 may be assisted by a funnel 170, chute or similar element for directing flavor material.

Subsequently, as shown in FIG. 15B, the mouthpiece element 110 may be attached to the side wall part 32 by latching elements 150 and the corresponding latch members 160. When the mouthpiece element 110 is attached to the side wall part 32, the channel insertion portion 130 is inserted into the channel 34.

As shown in FIG. 15C, the attachment of the mouthpiece element 110 to the side wall part 32 causes the channel insertion portion 130 to compress the flavor material 36 within the channel 34. The channel insertion portion 130 may compress the flavor material 36 by effectively reducing or removing empty space within the volume bound by the side walls of the channel 34, the inlet wall part 40 and the outlet wall part 70. The receptacle may be configured to compress the flavor material with respect to an uncompressed volume of flavor material by a range selected from the group comprising 5% to 40%, 10% to 35%, 15% to 30%, and 20% to 30%.

Furthermore, the volume defined by the inlet wall part 40, the side wall part 32 and the opening at the outlet end of the channel defined by the side walls may have a volume in the range selected from the group comprising 2 cm$^3$ to 10 cm$^3$, 3 cm$^3$ to 9 cm$^3$, 4 cm$^3$ to 8 cm$^3$ and 5 cm$^3$ to 8 cm$^3$. The volume defined by the inlet wall part 40, the side wall part 32 and outlet wall part 70 (when the mouthpiece element 110 is attached to the side wall part 32) may have a volume in the range selected from the group comprising 1 cm$^3$ to 8 cm$^3$, 2 cm$^3$ to 7 cm$^3$, 2.5 cm$^3$ to 6 cm$^3$ and 3 cm$^3$ to 5 cm$^3$. Furthermore, the volume defined by the inlet wall part 40, the side wall part 32 and the opening at the outlet end of the channel defined by the side walls may be filled with an uncompressed volume of flavor material in the range selected from the group comprising 50% to 95%, 60% to 85%, 65% to 80%, and 70% to 80%.

Figure 16:
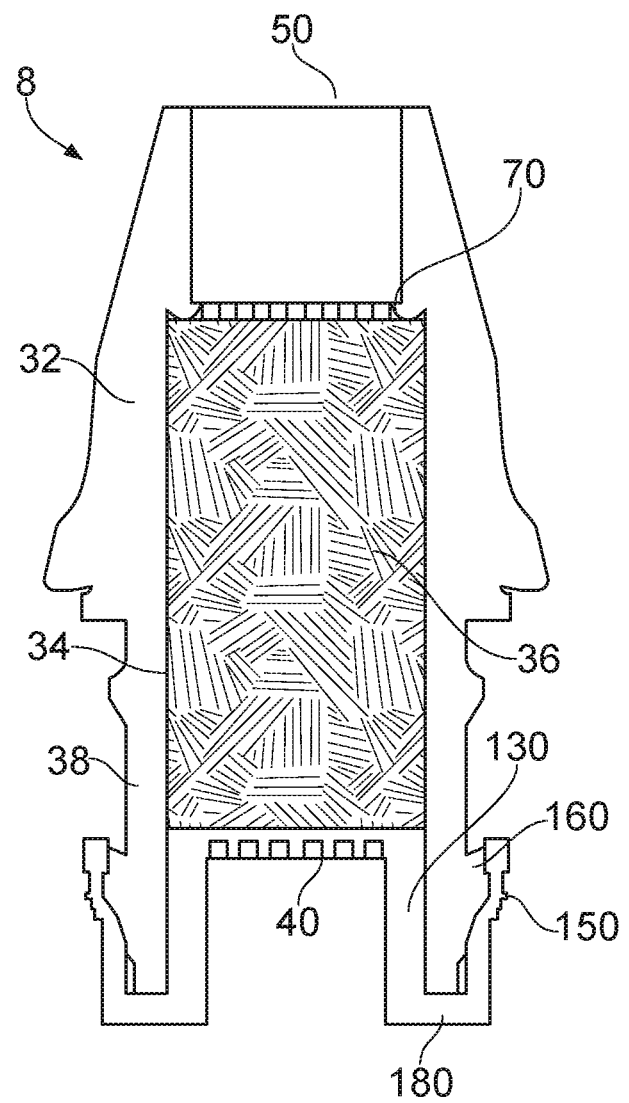
FIG. 16 schematically represents in cross-section a receptacle, including a flavor material, for use with an aerosol delivery system in accordance with certain embodiments of the disclosure.

FIG. 16 provides a view of a cross-section through a receptacle 8 in accordance with the example vapor delivery system 1 of FIG. 1, the plane of the cross-section being perpendicular to a longitudinal axis of the receptacle 8. In contrast to the receptacle of FIG. 14, the receptacle of FIG. 16 includes an attachment body 180, comprising an inlet wall part 40 and a latching element 150, which is configured to be connected to a side wall part 32. Aspects of FIG. 16 which are substantially similar to those shown in the preceding Figures will not be described in detail.

The receptacle 8 comprises a side wall part 32, an outlet wall part 70 and an inlet wall part 40. The side wall part 32 is configured to define a mouthpiece outlet 50 as well as the channel 34 within which a flavor material 36 may be provided, and, optionally, an outlet wall. The outlet wall part 70 may be attached separately to the side wall part 32 (for example, using ultrasonic welding or glue) or positioned using a lip feature as detailed in FIG. 14. A shelf or lip 120 for use in the receptacle of FIG. 16 may be configured to prevent the movement of the outlet wall part 70 (rather than the inlet wall) in a direction. The outlet wall part 70 may move within the channel 34 between the inlet end of the channel 34 and the lip 120, however the outlet wall part 70 may not move past the lip 120. Alternatively, the side wall part 32 and the outlet wall part 70 (and any other components of the housing) may be integrally formed, for example, by injection molding using a single mold, or other method as described above. The side wall part 32 may also define an insertion portion 38 of the receptacle 8 for insertion into a receiving portion 54 provided in an open end of air path 52 opposite to the end of the cartridge 4 which couples to the control unit 2. The insertion portion may be formed integrally with the side wall part 32 and the outlet wall part 70. Furthermore, while the outlet wall part 70 of FIG. 14 is planar or flat, in other examples the outlet wall part 70 may be non-planar and may, for example, be configured as described FIGS. 4A, 4B, 5, 6, and 8 to 13 and the associated embodiments.

In the example of FIG. 16, inlet wall part 40 is provided as part of an attachment body 180, which also includes a channel insertion part 130 which is inserted into channel 34 of the receptacle 8 when the inlet wall part 40 is attached to the housing. The inlet wall part 40 is provided at a base of the channel insertion part 130. The channel insertion part 130 is configured to have a shape closely matching and slightly smaller than the portion of the channel 34 in which it is inserted, such that when the channel insertion part 130 is inserted into the channel, the channel insertion part 130 fits closely to the side walls of the channel 34. As an example, the channel insertion part 130 and channel 34 may be cylindrical and the diameter of the channel insertion part 130 may be only slightly less than that of the channel 34. The inlet wall part 40 may be provided as a circular portion capping the cylinder formed by the channel insertion portion 130. It will be appreciated that the configuration of the channel 34, the channel insertion portion 130 may be provided in a variety of shapes, whilst still enabling a close fit between the channel 34 and the channel insertion portion 130.

In some examples, the side wall part 32 and the attachment body 180 may be releasably coupled together. When the flavoring material 36 within the receptacle 8 is exhausted or the user simply wishes to switch to a different flavoring material, the attachment body 180 may be detached from the side wall part 32 and the flavoring material 36 may be replaced within the channel 34. The side wall part 32 and the attachment body 180 may be coupled together such that a structural connection between the two parts is established. In the example of FIG. 14, the retention of the attachment body 180 which respect to the side wall part 32 is facilitated by a latching elements or clips 150 and corresponding latch members 160 for receiving portions of the latching elements 150.

The attachment body 180 may comprise a pair of latching elements 150. The two latching elements 150 are oppositely disposed, one on each side of the mouthpiece element 110. A latching element 150 comprises a foot part 152 and a leg part 151. In the current example, the leg 151 is a substantially elongate elements and the foot 152 is an element protruding from an end of the leg 151 substantially at 90 degrees to the elongate axis of the leg 151. The flexibility of the leg 151 allows movement of the foot 152 with respect to the remainder of the attachment body 180 (such as the channel insertion portion 130) when an external force is applied to the leg 151. The movement of the leg 151 (and the consequently the foot) may be considered a hinged movement that increases or decreases the angle of the leg 151, with respect to the remainder of the attachment body 180, from a rest position. The resilience of the leg 151 returns the angle to its original size when the force is removed, maintaining the usual shape of the latching element.

The latching element 150 is secured to the side wall part 32 so that the leg 151 and foot 152 extends beyond the upper face of the housing. In other words, a portion of the side wall part 32 and, at least, the leg 151 overlap in a longitudinal direction of the receptacle 8. The latching element 150 may be secured by anchoring the foot part 152 within the latch member 160. The foot part 152 lies generally in the plane of the latch members 160. The latch member 160 is shaped to receive the foot part 152, for example there is a hole or recess formed by protrusions of the latch member 160 extending from the side edge of the side wall part 32 into which the foot part 152 is inserted. For example, the side wall part 32 may be molded or otherwise include shaped parts formed from rigid plastic which engage around the foot part to house it and hence hold it in place.

In other examples, not shown, the mouthpiece element 120 may be mechanically or chemically coupled to the side wall part 32 in accordance with conventional techniques, for example based around a screw thread, latch mechanism, or bayonet fixing openings for establishing the electrical connection and air path between the two parts as appropriate. In some examples, the foot part 152 may be anchored by screws or rivets attached through the latching element 150 and into the side wall part 32, or by being glued or welded to the housing. It will be appreciated that in these examples, the side wall part 32 and the attachment body 180 may not be intended to be releasably coupled together.

During the filling process, the receptacle 8 is intended to be substantially filled with an amount of flavor material 36 after the outlet wall part 70 has been provided within the channel 34. The outlet wall part 70 may be retained in the channel 34, for example, due to the orientation of the receptacle 8 and the lip 120 (i.e. by gravity), or by any other means (e.g. gluing or welding). The flavor material 36 may then be provided into the receptacle 8 through the open inlet end of the channel 34. Filling of the receptacle 8 with the flavor material 36 may be assisted by a funnel, chute or similar element for directing flavor material. The attachment body 180 may be attached to the side wall part 32 by latching elements 150 and the corresponding latch members 160. When the attachment body 180 is attached to the side wall part 32, the channel insertion portion 130 is inserted into the channel 34. Attaching the attachment body 180 to the side wall part 32 causes the channel insertion portion 130 to compress the flavor material 36 within the channel 34. The channel insertion portion 130 may compress the flavor material 36 by effectively reducing or removing empty space within the volume bound by the side walls of the channel 34, the inlet wall part 40 and the outlet wall part 70. As detailed above, the receptacle may be configured to compress the flavor material with respect to an uncompressed volume of flavor material by a range selected from the group comprising 5% to 40%, 10% to 35%, 15% to 30%, and 20% to 30%.

Furthermore, the volume defined by the inlet wall part 40, the side wall part 32 and the opening at the outlet end of the channel defined by the side walls may have a volume in the range selected from the group comprising 2 $cm^3$ to 10 $cm^3$, 3 $cm^3$ to 9 $cm^3$, 4 $cm^3$ to 8 $cm^3$ and 5 $cm^3$ to 8 $cm^3$. The volume defined by the inlet wall part 40, the side wall part 32 and outlet wall part 70 (when the mouthpiece element 110 is attached to the side wall part 32) may have a volume in the range selected from the group comprising 1 $cm^3$ to 8 $cm^3$, 2 $cm^3$ to 7 $cm^3$, 2.5 $cm^3$ to 6 $cm^3$ and 3 $cm^3$ to 5 $cm^3$. Furthermore, the volume defined by the inlet wall part 40, the side wall part 32 and the opening at the outlet end of the channel defined by the side walls may be filled with an uncompressed volume of flavor material in the range selected from the group comprising 50% to 95%, 60% to 85%, 65% to 80%, and 70% to 80%.

Figure 17:
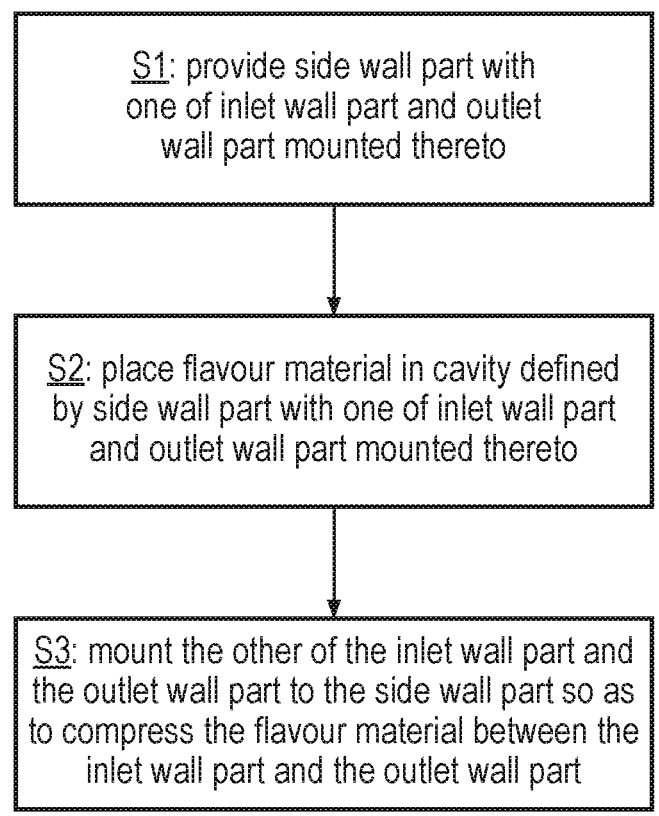
FIG. 17 schematically represents a method of manufacturing a receptacle for a flavor material for imparting a flavor to an inhalable medium generated by an apparatus for generating an inhalable medium in accordance with certain embodiments of the disclosure.

FIG. 17 schematically represents a method of manufacturing a receptacle for a flavor material for imparting a flavor to an inhalable medium generated by an apparatus for generating an inhalable medium in accordance with certain embodiments of the disclosure. The receptacle comprises a side wall part, an outlet wall part and an inlet wall part, wherein the side wall part defines a cavity for the flavor material and the inlet wall part and the outlet wall part each comprise a plurality of openings to allow airflow through the cavity, and the method comprises, at S1, providing the side wall part with one of the inlet wall part and the outlet wall part mounted thereto; at S2, placing flavor material into the cavity; and at a third step S3, mounting the other of the inlet wall part and the outlet wall part to the side wall part so as to compress the flavor material between the inlet wall part and the outlet wall part.

Thus there has been described an aerosol delivery system comprising an air path extending from a vapor generating region in which vapor is generated for user inhalation to a flavor imparting region of a receptacle for receiving a flavor imparting medium for imparting a flavor to the vapor; wherein the receptacle comprises a wall for retaining the flavor material, the wall comprising a plurality of openings for airflow and a non-planar region, wherein the plurality of openings are arranged in the non-planar region.

Furthermore there has been described an aerosol delivery system comprising an air path extending from a vapor generating region in which vapor is generated for user inhalation to a flavor imparting region of a receptacle for receiving a flavor imparting medium for imparting a flavor to the vapor; wherein the receptacle comprises a side wall part, an outlet wall part and an inlet wall part, wherein the side wall part defines a cavity for the flavor material and the inlet wall part and the outlet wall part each comprise a plurality of openings to allow airflow through the cavity, and wherein the inlet wall part and outlet wall part are mounted to the side wall part so as to compress the flavor material in the cavity between the inlet wall part and the outlet wall part.

Furthermore, there has been described an aerosol delivery system comprising an air path extending from a vapor generating region in which vapor is generated for user inhalation to a flavor imparting region of a receptacle for receiving a flavor imparting medium for imparting a flavor to the vapor generated by the aerosol delivery system; wherein the receptacle comprises a housing comprising a mouthpiece part, side walls and an outlet wall in the mouthpiece part with a plurality of openings for airflow, wherein the mouthpiece part, side walls and the outlet wall are integrally formed.

Furthermore, there has been described an aerosol delivery system comprising an air path extending from a vapor generating region in which vapor is generated for user inhalation to a flavor imparting region of a receptacle for receiving a flavor imparting medium for imparting a flavor to the vapor; wherein the receptacle comprises a housing comprising side walls and a lip extending inwardly from the sidewalls to support one of an inlet wall or an outlet wall of the receptacle.

Whereas the embodiments discussed above with reference to FIG. 1 have to some extent focused on devices having a liquid aerosolizable material to generate the inhalable medium, as already noted the same principles may be adopted for devices based on other aerosolizable materials, for example solid materials, such as plant derived materials, such as tobacco derivative materials, or other forms of aerosolizable material, such as gel, paste or foam based aerosolizable materials. Thus, the aerosolizable material may, for example, be in the form of a solid, liquid or gel which may or may not contain nicotine and/or flavorants. In some embodiments, the aerosolizable material may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it. In some embodiments, the aerosolizable material may for example comprise from about 50 wt %, 60 wt % or 70 wt % of amorphous solid, to about 90 wt %, 95 wt % or 100 wt % of amorphous solid.

The aerosolizable material (which may also be referred to as aerosol generating material or aerosol precursor material) may in some embodiments comprise a vapor—or aerosol—generating agent or a humectant. Example such agents are glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate. A formulation comprising one or more aerosol generating agent(s) may be called an active herein.

Furthermore, and as already noted, it will be appreciated the above-described approaches may be implemented in aerosol delivery systems, e.g. electronic smoking articles, having a different overall construction than that represented in FIG. 1. For example, the same principles may be adopted in an aerosol delivery system which does not comprise a two-part modular construction, but which instead comprises a single-part device, for example a disposable (i.e. non-rechargeable and non-refillable) device. Furthermore, in some implementations of a modular device, the arrangement of components may be different. For example, in some implementations the control unit may also comprise the vaporizer with a replaceable cartridge providing a source of aerosolizable material for the vaporizer to use to generate aerosol.

Furthermore still, in some examples the receptacle (flavor insert-pod) arranged in the airflow path through the device may be upstream of the vaporizer as opposed to downstream of the vaporizer.

As used herein, the terms "flavor" and "flavorant", and related terms, refer to materials which, where local regulations permit, may be used to create a desired taste or aroma in a product for adult consumers. The materials may be imitation, synthetic or natural ingredients or blends thereof. The material may be in any suitable form, for example, oil, liquid, or powder.

In order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention(s). It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc., other than those specifically described herein, and it will thus be appreciated that features of the dependent claims may be combined with features of the independent claims in combinations other than those explicitly set out in the claims. The disclosure may include other inventions not presently claimed, but which may be claimed in future.

The invention claimed is:

1. An apparatus for generating an inhalable medium comprising:
   a receptacle for a flavor material for imparting a flavor to inhalable medium generated by the apparatus, the receptacle comprising:
      a wall part for retaining the flavor material, the wall part comprising a plurality of openings for airflow and a non-planar region, wherein the plurality of openings are arranged in the non-planar region and, wherein the non-planar region comprises a depression of the wall part towards the center of the receptacle.

2. The apparatus of claim 1, wherein the non-planar region comprises a continuously curved surface.

3. The apparatus of claim 1, wherein a first radius of curvature for the non-planar region in a first plane perpendicular to an airflow direction during normal use is in a range selected from the group consisting of: 0.3 cm to 3.0 cm, 0.3 to 2.5 cm, 0.3 cm to 2.0 cm, 0.3 cm to 1.5 cm and 0.3 cm to 1.0 cm.

4. The apparatus of claim 3, wherein a second radius of curvature for the non-planar region in a second plane perpendicular to the airflow direction during normal use and the first plane is in a range selected from the group consisting of: 0.3 cm to 3.0 cm, 0.3 to 2.5 cm, 0.3 cm to 2.0 cm, 0.3 cm to 1.5 cm and 0.3 cm to 1.0 cm.

5. The apparatus of claim 3, wherein the non-planar region is not curved in a second plane perpendicular to the airflow direction during normal use and the first plane.

6. The apparatus of claim 1, wherein the plurality of openings are arranged in a regular pattern.

7. The apparatus of claim 1, wherein the plurality of openings are arranged concentrically around a center of the non-planar region.

8. The apparatus of claim 1, wherein each of the plurality of openings extends through the wall part in a direction which is parallel to a common axis.

9. The apparatus of claim 1, wherein each of the plurality of openings extends through the wall part in a direction which parallel to a local normal to the wall part.

10. The apparatus of claim 1, wherein the receptacle comprises a side wall part at least partially defining a cavity for the flavor material.

11. The apparatus of claim 10, wherein at least a portion of the wall part intersects the side wall part at an angle interior to the receptacle which is less than 90°.

12. The apparatus of claim 11, wherein the receptacle comprises one or more liquid guiding channels formed in at least one of the side wall part or the wall part and arranged to guide liquid condensed in the receptacle towards the intersection between the wall part and the side wall part.

13. The apparatus of claim 10, wherein the receptacle comprises a second wall part comprising a plurality of openings to allow airflow through the cavity, and wherein the wall part and the second wall part are mounted to the side wall part so as to compress the flavor material in the cavity between the wall part and the second wall part.

14. The apparatus of claim 10, further comprising a mouthpiece part, wherein the wall part comprising the plurality of openings is an outlet wall part in the mouthpiece part, and wherein the mouthpiece part, the side wall part and the outlet wall part are integrally formed.

15. The apparatus of claim 1, wherein the apparatus further comprises:
   an aerosolizable material,
   a heater configured to selectively aerosolize the aerosolizable material to generate the inhalable medium, and
   an airflow channel to guide the inhalable medium towards an inlet of the receptacle.

16. A receptacle for a flavor material for imparting a flavor to an inhalable medium generated by an apparatus for generating an inhalable medium, the receptacle comprising:
   a wall part for retaining a flavor material, the wall part comprising a plurality of openings for airflow and a non-planar region, wherein the plurality of openings are arranged in the non-planar region and, wherein the non-planar region comprises a depression of the wall part towards the center of the receptacle.

17. Means for generating an inhalable medium comprising:
   receptacle means for flavor material means for imparting a flavor to inhalable medium generated by the means for generating an inhalable medium, the receptacle means comprising:
      wall means for retaining the flavor material means, the wall means comprising a plurality of opening means for airflow and a non-planar region, wherein the plurality of opening means are arranged in the non-planar region and, wherein the non-planar region comprises a depression of the wall part towards the center of the receptacle.

18. A method of imparting a flavor to inhalable medium generated by an apparatus for generating inhalable medium, the method comprising:
   providing a receptacle for a flavor material for imparting a flavor to the inhalable medium, the receptacle comprising a wall part for retaining the flavor material, the wall part comprising a plurality of openings for airflow and a non-planar region, wherein the plurality of openings are arranged in the non-planar region and, wherein the non-planar region comprises a depression of the wall part towards the center of the receptacle; and passing the inhalable medium through the receptacle to impart the flavor to the inhalable medium.

* * * * *